United States Patent
Alder et al.

(10) Patent No.: US 10,286,631 B2
(45) Date of Patent: May 14, 2019

(54) BENT, VENEER-ENCAPSULATED HEAT-TREATED SAFETY GLASS PANELS AND METHODS OF MANUFACTURE

(71) Applicant: Precision Glass Bending Corporation, Greenwood, AR (US)

(72) Inventors: Russell Ashley Alder, Fort Smith, AR (US); Richard Ashley Alder, Fort Smith, AR (US)

(73) Assignee: Precision Glass Bending Corporation, Greenwood, AR (US)

( * ) Notice: Subject to any disclaimer, the term of this patent is extended or adjusted under 35 U.S.C. 154(b) by 0 days.

(21) Appl. No.: 15/169,797

(22) Filed: Jun. 1, 2016

(65) Prior Publication Data
US 2016/0354996 A1  Dec. 8, 2016

Related U.S. Application Data

(60) Provisional application No. 62/170,240, filed on Jun. 3, 2015.

(51) Int. Cl.
*B32B 17/10* (2006.01)
*C03B 23/025* (2006.01)
(Continued)

(52) U.S. Cl.
CPC .. *B32B 17/10293* (2013.01); *B32B 17/10036* (2013.01); *B32B 17/10091* (2013.01);
(Continued)

(58) Field of Classification Search
CPC ........ B32B 17/10155; B32B 17/10293; B32B 17/10302
See application file for complete search history.

(56) References Cited

U.S. PATENT DOCUMENTS

| 4,824,722 A | 4/1989 | Jarrett |
|---|---|---|
| 5,496,640 A | 3/1996 | Bolton |

(Continued)

FOREIGN PATENT DOCUMENTS

| DE | 102006042538 | 3/2008 |
|---|---|---|
| FR | 3012073 | 4/2015 |

(Continued)

OTHER PUBLICATIONS

NPL from PPG, retrieved Sep. 30, 2016 from http://buyat.ppg.com/glasstechlib/98_TD138%20Heat%20Treated%20Glass%20for%20Architectural%20Glazing%204%20Nov%202011.pdf.*

*Primary Examiner* — Z. Jim Yang
(74) *Attorney, Agent, or Firm* — Stephen D. Carver

(57) ABSTRACT

A laminated, bent, safety glass panel (30) for architectural or interior uses and a method of manufacturing such panels. The panel comprises a single heat-treated bent glass sheet, fully-tempered or heat-strengthened, forming a substrate (32) encapsulated by at least one thin, chemically-strengthened, glass veneer sheet (38). The veneer sheet (38), an alkali-aluminosilicate or other alkali-containing glass recipe strengthened by ion-exchange treatment, is cold-bent over a polymer interlayer (40) and permanently laminated to form a protective barrier on the heat-treated glass that dampens the explosive release of its internal residual stresses in the event of breakage thereby preventing particles dislodging and subsequent disintegration. The vulnerable perimeter (37) and perforation (45) edges of the veneer sheet (38) are equal in size or inset to the edges of the heat-treated substrate (32) with its deeper robust compressive stresses. Veneers may be laminated to both major substrate surfaces.

2 Claims, 30 Drawing Sheets

(51) Int. Cl.
  *C03B 33/08* (2006.01)
  *C03C 21/00* (2006.01)
  *C03C 27/10* (2006.01)
  *E06B 1/00* (2006.01)
  *C03C 3/085* (2006.01)
  *C03C 3/087* (2006.01)
  *C03C 3/091* (2006.01)
  *C03C 3/093* (2006.01)

(52) U.S. Cl.
  CPC .... *B32B 17/1099* (2013.01); *B32B 17/10137* (2013.01); *B32B 17/10155* (2013.01); *B32B 17/10174* (2013.01); *B32B 17/10302* (2013.01); *B32B 17/10743* (2013.01); *B32B 17/10761* (2013.01); *B32B 17/10853* (2013.01); *B32B 17/10889* (2013.01); *B32B 17/10935* (2013.01); *C03B 23/0252* (2013.01); *C03B 33/082* (2013.01); *C03C 3/085* (2013.01); *C03C 3/087* (2013.01); *C03C 3/091* (2013.01); *C03C 3/093* (2013.01); *C03C 21/002* (2013.01); *C03C 27/10* (2013.01); *E06B 1/006* (2013.01); *B32B 2419/00* (2013.01)

(56) References Cited

U.S. PATENT DOCUMENTS

| | | | | |
|---|---|---|---|---|
| 5,506,057 | A * | 4/1996 | Olson | B32B 17/10 156/102 |
| 5,545,277 | A * | 8/1996 | Hashemi | B28D 1/00 156/106 |
| 5,895,721 | A | 4/1999 | Naoumenko | |
| 5,908,675 | A * | 6/1999 | Marquardt | B32B 17/10036 156/106 |
| 5,928,793 | A | 7/1999 | Kimura | |
| 6,479,155 | B1 | 11/2002 | Gelderie | |
| 7,678,441 | B2 | 3/2010 | Smith | |
| 2001/0001686 | A1 * | 5/2001 | Kishida | B24B 9/10 428/192 |
| 2005/0276990 | A1 | 12/2005 | Kohara | |
| 2007/0223096 | A1 | 9/2007 | O'Connor | |
| 2009/0047509 | A1 | 2/2009 | Gagliardi | |
| 2012/0028015 | A1 | 2/2012 | Langsdorf | |
| 2012/0121912 | A1 * | 5/2012 | Varma | B32B 17/10036 428/413 |
| 2013/0127202 | A1 | 5/2013 | Hart | |
| 2013/0209751 | A1 | 8/2013 | Zhang | |
| 2013/0302581 | A1 * | 11/2013 | Mannheim Astete | B32B 17/10064 428/214 |
| 2014/0060306 | A1 * | 3/2014 | Bertolini | F41H 5/0407 89/36.02 |
| 2014/0234576 | A1 * | 8/2014 | Berard | B32B 17/10293 428/137 |
| 2014/0340730 | A1 * | 11/2014 | Bergh | B23K 26/38 359/275 |
| 2015/0110991 | A1 * | 4/2015 | Miwa | C03B 33/076 428/77 |
| 2015/0146286 | A1 | 5/2015 | Hagen | |
| 2016/0082705 | A1 * | 3/2016 | Fisher | B32B 17/10036 428/215 |
| 2016/0207290 | A1 * | 7/2016 | Cleary | B32B 17/10366 |
| 2016/0250825 | A1 * | 9/2016 | Cleary | B32B 17/10761 428/215 |

FOREIGN PATENT DOCUMENTS

| | | | |
|---|---|---|---|
| GB | 2011316 | 7/1979 | |
| JP | 2007 197288 | 8/2007 | |
| WO | WO-2012157610 A1 * | 11/2012 | ........... C03B 33/076 |
| WO | WO 2014176059 A1 * | 10/2014 | ....... B32B 17/10036 |
| WO | WO2014209861 A1 | 12/2014 | |
| WO | WO 2015031594 A2 * | 3/2015 | ....... B32B 17/10366 |
| WO | WO2015031594 A2 | 3/2015 | |
| WO | WO2016/108005 | 7/2016 | |

* cited by examiner

BENT, VENEER-ENCAPSULATED HEAT-TREATED SAFETY GLASS PANELS AND METHODS OF MANUFACTURE

CROSS-REFERENCE TO RELATED APPLICATION

This application is based upon, and claims priority from, pending U. S. Provisional Application entitled "Bent Safety Glass Panel For Architectural Or Interior Uses with a Thin, Cold-Bent Glass Veneer Laminated to Encapsulate Stress in a Single Bent Heat-Treated Substrate, and Method of Making Same," by inventors Russell Ashley Alder and Richard Ashley Alder, Ser. No. 62/170,240, filed in the U. S. Patent and Trademark Office Jun. 3, 2015.

BACKGROUND OF THE INVENTION

I. Field of the Invention

The present invention relates generally to heat-treated, bent laminated glass products, including bent, laminated, fully-tempered or heat-strengthened glass panels for use as enhanced safety glazing material in architectural and interior applications, and a method of manufacturing them. More particularly, the invention relates to veneered, fully-tempered or heat-strengthened glass panels comprising an alkali-aluminosilicate, glass layer cold-bent over a polymer interlayer to form a protective barrier that safely encapsulates the internal residual stresses, which, in the event of its breakage, prevents particles from dislodging and subsequent disintegration. Relevant prior art can be found in USPC 65 (i.e., "... glass processing ... "), Subclasses 25.4, 104, 106 and others; and USPC 428 (i.e., "... stock materials ... "), Subclasses 195.1, 410-411, 421, 426-438, and 442-444.

II. Description of the Prior Art

As is well recognized in the art, there are a wide variety of bent glass products, involving both heat-treated and non-heat-treated products. Bent glass is flat glass which has been shaped while hot into a body having curved surfaces. Typically, bent glass products are distinguished by a variety of factors and characteristics. The flat glass sheets which are hot bent are typically of a "soda-lime silicate" composition available in raw sheets of exceptional quality and flatness as made by primary producers with the "float process" known in the art. These raw sheets are usually clear, ultra clear low-iron, or they may be tinted gray, bronze, green, or blue. They may have a coating applied by the primary producer to yield special properties such as water-damage resistance, scratch resistance, or low-emissivity and/or reflectance. Heat-treated bent glass typically refers to a flat, glass sheet which has been not only heated to temperatures of about 620 degrees C. and above, then bent in its hot plastic state, but also force cooled to impart a compression/tension relationship between its surfaces and core.

There are two principal kinds of heat-treated glass: "heat-strengthened" and "fully-tempered" glass. Heat-strengthened glass is cooled slower than fully-tempered glass, which is cooled faster and exhibits relatively higher surface compression and corresponding internal tension. Heat-treated, fully-tempered, bent glass is characterized as having a surface compressive stress of at least 69 MPa., or an edge compressive stress of at least 67 MPa., and deep residual stresses that, if released in the event of breakage, result in a self-propagating fracture pattern into small, but sometimes clumped, dull particles. Fully-tempered glass with appropriate testing may be classified as a safety glass product in the United States of America suitable for many architectural and interior applications. Heat-treated, heat-strengthened glass, as defined broadly, is characterized as having a surface compressive stress of at least 24 MPa. Heat-treated, heat-strengthened glass, as defined more narrowly by industry standard ASTM C1048, is characterized as having a surface compressive stress of between 24 MPa. and 52 MPa. Heat-strengthened glass has deep residual stresses that, if released, also cause a self-propagating fracture pattern but into larger pieces. Without secondary lamination, heat-strengthened glass is not classified as a safety glass because its fracture pattern includes larger particles. Heat-treated bent glass has relatively fast rates of production, owing to the quick cycle of heating, bending, and rapid cooling.

Non-heat-treated bent glass refers to annealed glass, with or without later chemical-strengthening, which has also been heated to temperatures of about 620 degrees C. and then bent in its hot plastic state, but which is cooled slower than "heat-treated" bent glass to prevent the buildup of residual stresses within the glass. Non-heat-treated, annealed, glass has minimal surface compressive stress, typically not more than 1.38 MPa., and is characterized as being without strength enhancement but internally stable. Annealed glass without secondary lamination is not classified as a safety glass product because its fracture pattern includes large, sharded particles. Non-heat-treated, chemically-strengthened glass is annealed glass which, following cooling, has been subject to an ion-exchange process to impart the surface region with a high level of compressive stress by chemical means, and thus enhanced strength. The compression forces, while typically at a level on the surface far higher than fully-tempered glass, extend to only a shallow depth measured in microns. The corresponding tension stress, the same forces which cause fully-tempered glass to disintegrate into small particles, are distributed across the remaining thickness at a lower level insufficient to result in a granular fracture pattern except on very thin sheets. Chemically-strengthened glass without secondary lamination is not classified as a safety glass because of this typically larger fracture pattern. Non-heat-treated, bent glass has slow rates of production with long cycles of heating, bending, and cooling, plus multiple secondary hours in a salt tank, if chemically-strengthened properties are required.

Heat-treated glass must be made as individual pieces because of the need to force cool all glass surfaces simultaneously to uniformly impart compression/tension forces. Typically, optical quality and edge quality are both excellent, as each heat-treated glass piece is produced as a single monolithic panel. A highly polished edge finish may be added before bending, and remains unchanged by the heat-treating process. Compressive stresses in the surface of glass sheets are desirable because microscopic flaws are forced closed allowing higher thermal or mechanical loads including impacts to be tolerated before a flaw opens and a crack propagates into breakage. Compressive stresses within heat-treated, fully-tempered glass provide enhanced strength which is at least four times the strength of annealed, bent glass of the same thickness Compressive stresses within heat-treated, heat-strengthened glass provide enhanced strength which is at least two times the strength of annealed, bent glass of the same thickness. However, the shape conformance is less accurate than non-heat-treated bent glass, because the deep residual stresses always slightly alter the shape with some level of unpredictability.

Once the glass is heat-treated, excessive thermal or mechanical loads including by impact may result in breakage with the release of internal residual stress and subsequent disintegration, explosively in the case of fully-tempered glass. However there always remains a risk of such failure occurring spontaneously even years after production due to imperfections in the glass. For example, the presence of microscopic inclusions of nickel-sulfide contaminant in raw flat glass sheets which increase in size over time is a well documented cause of spontaneous breakage. Additionally, damage or dimensional changes to the glass edges or surfaces after heat-treating instead of causing immediate breakage may result in instability causing spontaneous breakage at a later time. Spontaneous breakage, though a rare occurrence, is a more pronounced risk with the higher residual stresses of fully-tempered glass than the lesser residual stresses of heat-strengthened glass. Recently, there have been numerous reports of incidents of spontaneous breakage occurring in single fully-tempered glass pieces installed overhead in vehicle sunroofs which have highlighted the potential risk of the phenomenon in all heat-treated glass applications. Regardless of the cause of breakage, the resulting release of internal residual stress causes fracturing of the heat-treated glass sheet into unbound glass particles.

Several methods have been pursued to modify single heat-treated glass pieces to limit the danger posed by the release of residual stress into unbound particles. Colored silicone, for example, has been sprayed onto the indoor face of single pieces as an opacifier for spandrel applications which also serves as a pliable structural backing for "fallout resistance" in the event of breakage. However, a sprayed polymer with pristine optical clarity for a vision application, hardiness for open exposure to the environment, as well as repellent of soiling has proved elusive. Another method is the addition of a polymer safety film to one or both faces of single heat-treated pieces. However applied films are vulnerable to degradation from the environment, including yellowing, scratching, peeling, or abrasions and add expense not just for initial installation but also field maintenance. A third method is the application of a polymer sheet to the face of the heat-treated piece which is adhered through compression and heat by means of a sacrificial cover sheet. However the exposed face of the polymer sheet is also vulnerable to environmental damage and even tiny specks of dust adjoining the sacrificial layer during processing produce blisters in the polymer surface and poor optical quality.

There is an ongoing industry effort to transition away from the installation of single sheets of fully-tempered safety glass in locations directly overhead, where the unsecured release of energy within the glass may result in disintegration and the release of falling glass particles, presenting a safety hazard. For example, following a well publicized incidence of fully-tempered glass panels spontaneously breaking on balconies in a high-rise building in Canada, Supplementary Standard SB-13 to the 2006 Ontario Building Code was enacted requiring measures be taken in the design of glass guards to reduce the probability of injury from falling, broken glass. More recently, the 2015 International Building Code now being adopted by local jurisdictions in the United States of America requires glass "used in a handrail, guardrail or a guard section" be a "laminated glass constructed of fully-tempered or heat-strengthened glass". In the latter building code, traditional single pieces of fully-tempered safety glass are limited to applications "where there is no walking surface beneath them or the walking surface is permanently protected from the risk of falling glass". In railing and many other glass applications, single, fully-tempered glass pieces are increasingly being transitioned to a laminated glass with two or more glass layers bound together by a plastic interlayer. This solution minimizes the risk of injury by unbound glass fragments in the event of breakage.

Laminated, bent safety glass consists of two or more sheets of annealed, or chemically-strengthened, or fully-tempered or heat-strengthened glass that are permanently bonded together by a tough, plastic interlayer. Such products exhibit a layered, sandwiched appearance, including a plastic interlayer visible as a dull band in the approximate middle of the glass edge thickness. A laminated safety glass, like single layer, fully-tempered glass, can qualify by testing as a safety glazing material in architectural and interior applications, since the glass mass remains substantially unitary without large tears, shears, or openings though some smaller particles may dislodge. When broken, the fractured glass particles remain bound together by the plastic interlayer, and the resultant broken assembly is restrained by the support system, and is therefore less likely to cause injury.

Bent, laminated glass panels for architectural and interior applications are almost invariably assembled with glass layers of like kind and thickness. For example, two layers of 5.7 mm. thickness bent chemically-strengthened glass may be laminated together with a polymer interlayer. This symmetry of layers reduces the complexity of design and specification as well as production. With the latter approach there is an intentional effort to replicate the characteristics between glass layers in the final laminated assembly, including their dimensional tolerances and shape. However, this approach, which typically characterizes flat, laminated glass production where bullet resistance or blast resistance is not required, has distinct drawbacks in the production of bent laminated glass products, and their resulting characteristics.

Laminated, non-heat-treated bent safety glass consists of two or more sheets of annealed or chemically-strengthened glass that are permanently bonded together by a tough, plastic interlayer. The glass sheets are heated in matching sets to temperatures of about 620 degrees C., bent together in a hot plastic state, and then cooled slowly to prevent the buildup of residual stresses within the glass. The non-heat-treated glass layers in the set conform substantially to the shape of each other. As a final step, the glass layers are marked by temporary ink on the same corner before disassembly for cleaning. At this time the glass layers may undergo chemical-strengthening if required. The glass layers in the set are then reassembled, carefully realigning the ink markings so as to return each glass sheet to its exact same position in the original hot bent set, followed by lamination. Optical quality is excellent because each set of non-heat-treated glass is bent together as a single unitary body.

However, laminated, non-heat-treated, annealed bent glass lacks enhanced strength and, as a result, is vulnerable to cracking from both thermal stresses and mechanical weakness. Additionally, there may be slight misalignment in the edges of component annealed glass layers after lamination, which may require repolishing if installed with an exposed edge condition. Repolishing already curved glass is a laborious process and in combination with the dull interlayer in the center of the thickness, bent laminated annealed glass panels never attain the high level of monolithic gloss finish possible with machine polished, single heat-treated pieces. Most importantly however bent, laminated, annealed glass is without strength enhancement in the glass layers and is at increased risk for cracking under thermal or mechanical loading. Cracking may result from mechanical loads if, for example, the glass panel is subject to high winds, accidentally "knocked" on exposed perimeter edges, or especially if subject to the high localized forces of mounting hardware attached through perforations in the glass. Additionally, cracking may result from thermal loads if for example an exterior glass panel is subject to high levels of solar energy absorption as occur with darkly tinted, spandrel, and low-emissivity coated glass, especially with simultaneous conditions of partial shading across the panel.

Laminated, non-heat-treated, bent chemically-strengthened glass demonstrates thermal and mechanical strength. Laminated panels with two or more layers of bent float glass of a soda-lime silicate recipe, and which have been chemically-strengthened, have for a number of years been commercially available. The enhanced strength provided by the bent chemically-strengthened glass layers is superior to simple bent laminated annealed glass panels. However, bent glass panels must often be fabricated from raw glass sheets already sprayed at time of manufacture by the primary producer with a water-damage-resistant, scratch resistant, low-emissivity and/or a reflective coating. The exchange of ions during the chemical-strengthening process is effectively blocked by the coating on the glass surface, requiring pre-coated glass be eliminated if strengthening is to be realized across all surfaces. Furthermore, glass with ceramic-frit paint fired into the surface during bending not only blocks the strengthening in painted areas but may introduce salt bath contaminants. Finally, laminated, chemically-strengthened glass is relatively more expensive due to its slow rate of production.

Laminated bent glass panels composed of two or more layers of thin, chemically-strengthened glass have been suggested as an improved light-weight product, most notably for vehicular applications. However, all bent laminated glass panels assembled from layers of chemically-strengthened glass exhibit a weakness at the edges when compared to single, fully-tempered glass pieces. The compressive stress in chemically-strengthened glass generally extends to a depth less than 150 microns and is thus many times shallower than, for example, the approximately 2,480 to 3,100 micron depth of compressive stress in a 12.4 mm. thickness, fully-tempered glass sheet. As a result, exposed unprotected perimeter edges, as well as the edges of perforations including holes or notches, leave the panel vulnerable to cracking from accidental impact or mechanical forces at these locations especially if the high compression is lessened by chipping or abrasions or scratches. Additionally if the perimeter edges or perforations are in misalignment after lamination, then the manufacturer's choice is between leaving the product with reduced edge quality, and reworking the product where dimensional changes relieve compression with a concordant reduction in strength.

Some hybrid bent laminated glass assemblies have been proposed in prior art that are assembled with different kind glass layers. For example, a thin annealed glass layer may be laminated to a thin layer of chemically-strengthened glass. However, such proposals have concentrated on automotive glazing and attaining high impact resistance to flying objects like hail and stones as well as mechanical strength suitable to attain ultrathin overall laminated panel assemblies that reduce vehicle weight and increase overall fuel economy. However, panel lightness and ultrathin assemblies are of limited utility in most architectural and interior glazing applications. While these properties may be desirable in their own right, single, fully-tempered glass pieces installed in architectural and interior applications have for many decades performed adequately in regards to their resistance to external impact, overall thickness, and weight. Where single pieces of fully-tempered glass have been inadequate for architectural and interior glazing is in the event of breakage, when the very residual stress providing enhanced strength results in an explosive detonation of the sheet, its disintegration, and the ejection of particles. Where the characteristics of a fully-tempered glass are desirable but the potential unbridled release of energy is considered unacceptable, the accepted solution within the bent glass industry has been to laminate together two or more layers of fully-tempered glass.

Laminated, heat-treated, bent safety glass consists of two or more sheets of heat-treated glass, fully-tempered or heat-strengthened, which are permanently bonded together by a tough, substantially translucent plastic interlayer. Breakage results in cracking, but fragments are bound together by the resilient, plastic interlayer, though some smaller particles may dislodge with the explosive release of residual stress in the event of breakage. Such glass exhibits enhanced strength compared to laminated, non-heat-treated, bent glass, especially in response to irregularities such as holes or notches. The strength of laminated heat-treated, fully-tempered bent glass is roughly four times greater than that of a laminated, non-heat-treated annealed bent glass of the same thickness. The strength of a laminated heat-treated, heat-strengthened bent glass is roughly two times greater than that of laminated non-heat-treated annealed bent glass of the same thickness. In both cases with heat-treated glass, the compressive stresses are deep, extending in a quarter to a fifth of the thickness of the glass from each major surface and this distance or greater from perimeter edges and perforations such as holes or notches. While these regions remain vulnerable to accidental impact or mechanical forces in all glass, the compressive stresses are deeper and more readily able to resist breakage when compared to bent laminated chemically-strengthened glass. However, the shape conformance of and between heat-treated glass layers is less accurate than non-heat-treated glass layers because the deep compression/tension forces always slightly alter the shape with some level of unpredictability.

Even with laminated, heat-treated, bent safety glass products there have hitherto been known disadvantages. The variable plastic interlayer thickness caused by poor shape matching between the sets of bent, heat-treated sheets produces optical waviness when looking through the glass. Another disadvantage is that edge quality may be very poor. Again, the plastic interlayer is visible as a dull band in the approximate middle of the glass thickness. Even with careful efforts to align heat-treated layers, unpredictable differences in shape conformance produce variations in sizing and nesting, often resulting in overhangs along the edges between one glass layer and another. Additionally, any polishing or dimensional change, once the bent glass is heat-treated, may cause breakage or later instability and therefore is prohibited. Tolerances listed in US industry standard ASTM C 1172 allow for a mismatch between assembled glass layers on the edges of laminated, heat-treated flat glass panels of as large as between 5.6 mm. and 7.9 mm. depending on overall assembly thickness. However the quality of edges is often found less than desirable in exposed edge installations when assembled in accordance with such standards. In addition, the wide range of tolerances leads to decreased edge quality at perimeters and perforations, which is further exasperated by shape requirements. One of our design goals is to remedy the latter problems and seek a more exacting solution.

Conventional bent, laminated, fully-tempered glass panels when used as a safety glazing material in architectural and interior applications typically exhibit imperfections along perimeter edges and perforations, such as holes or notches with misalignment and obtrusive overhangs. A conventional bent, laminated, fully-tempered glass panel also exhibits higher levels of transmissive distortion because of dissimilar symmetry between adjoining sheets. Irregular polymer interlayer thicknesses required to fill gaps between laminates are likely to produce unwanted optical distortion. Indeed, variations in the thickness of the plastic interlayer across local areas of the panel may result in a lens effect, where objects look larger or smaller when looking through the glass at varying angles and locations. Often such optical irregularities, as well as the visibility of the interlayer along the thickness, are compounded by the use of a thicker polymer interlayer that is better able to fill voids between mismatched layers. Conventional bent, laminated fully-tempered glass panels are inefficient to produce, with the repetitive fabrication of individual bent fully-tempered glass sheets and the potential risk of costly delamination resulting from the application of high forces that are needed to unitize the laminated assembly. In short, the problem is that it is virtually impossible to economically manufacture two identically matching, thick, bent and heat-treated glass sheets for lamination.

Known methods of manufacturing heat-treated, bent glass sheets through current bending technology are generally incapable of producing consistently matching, individual heat-treated glass pieces suitable for lamination using normal cost-effective methods. Compression/tension forces induced in the heat-treating process always slightly alter sheet shapes. Many production variables experienced during production influence product quality. Varying humidity and temperature of cooling air, production sequence, and tooling tolerances are factors. Further, differential heating patterns for glass, especially glass with a low-emissivity coating or ceramic-frit paint applied to all or part of the surface, slightly alter the distribution of residual stress and shape. Conventional industry equipment is designed for flexibility in shape and size, rather than sequential production of identical parts to exacting tolerances. Current laminating methodologies often result in the mechanical forcing of mismatched plies together. The lack of consistent matching of bent, heat-treated plies during lamination may cause optical distortion in the end product due to variable thicknesses of the plastic interlayer. Resultant edge quality is poor as bent, heat-treated glass plies may not be altered after production, and thus size differences or misalignment at the edges cannot be remedied with current technology. An inconsistency in matching enhances the visibility of the interlayer located in the glass center. Further, there is a risk of delamination caused by the forcing of dissimilar, heat-treated glass plies into a unitary laminated body.

The prior art reflects a wide variety of laminated glass products involving one or more of the above-discussed concepts. For example, U.S. Pat. No. 4,824,722 issued Apr. 25, 1989 discloses a safety glass laminate comprising a first sheet of organic or inorganic glass and a second rigid sheet, which may also be of organic or inorganic glass, with a flexible plastic interlayer therebetween that is bonded to each of the sheets by adhesive which has been cured by irradiation. The interlayer comprises two outer layers of plastic film and an inner layer of fabric, preferably woven polyester, interposed therebetween. The laminate may be employed as decorative cladding or as a panel for a glass door.

U.S. Pat. No. 5,496,640 issued Mar. 5, 1996 discloses fire resistant transparent, laminates comprising at least two parallel sheets of transparent material, at least one optically transparent fluorocarbon polymer, at least one optically transparent glass or resinous inner layer between the parallel sheets, and at least one layer of an optically transparent, intumescent gel.

U.S. Pat. No. 5,928,793 issued Jul. 27, 1999 discloses a laminated glass for vehicles comprising at least two single glass sheets which are laminated through at least one interlayer, wherein an outermost single glass sheet in a laminate comprising at least two single glass sheets is an alkali-aluminosilicate glass containing lithia. The laminated glass is suitable as the countermeasure of flying stones when applied to windows of vehicles. The alkali-aluminosilicate glass sheet is preferably obtained by a float method, and it is also preferably chemically tempered by ion-exchange.

U.S. Pat. No. 6,479,155 issued Nov. 12, 2002 discloses another fire-resistant, laminated glass panel. The glass-ceramic pane is joined, on each of its two faces, to a silicate glass pane by means of transparent, intermediate layers having a refractive index corresponding to the refractive index of the glass and the glass-ceramic. Transparent intermediate plies consist of a thermoplastic polymer having a high splinter fixation effect, and the silicate glass panes consist of tempered float glass.

U.S. Pat. No. 7,678,441 issued Mar. 16, 2010 discloses thermoplastic interlayer sheets or films for laminated safety glass with superior vacuum de-airing at elevated temperatures and superior tacking and edge sealing properties. The sheeting has an embossed surface pattern on at least one of the surfaces, which provides relatively uninterrupted channels for de-airing in at least two non-parallel directions.

U.S. Pat. Publication No. 2005/0276990 published Dec. 15, 2005 discloses a process for producing alumina coating composed mainly of alpha-type crystal structure, laminate coating including the alumina coating, a member clad with the alumina coating or laminate coating, and a process for production.

U.S. Pat. Publication No. 2009/0047509, published Feb. 19, 2009, discloses a coated glass pane with a low-e and/or solar control coating comprising at least a lower anti-reflection layer, an IR-reflecting layer, and an upper anti-reflection layer. At least one of the anti-reflection layers comprises at least one compound layer containing a mixture of an (oxy) nitride of Si and/or Al and of ZnO. The coated glass panes are heat-treatable, i.e., toughened and/or bendable.

U.S. Pat. Publication No. 2012/0028015 published Feb. 2, 2012 discloses laminated, transparent panes made of brittle materials and interleaved laminated films, wherein the brittle materials are various glasses, special glasses, glass-ceramics, transparent ceramics and crystalline materials. A process for producing and bending the panes and films, and its use thereof as bulletproof, unbreakable and shockproof glazing with a low weight per unit volume are disclosed.

U.S. Pat. Publication No. 2012/0328843 published Dec. 27, 2012 discloses thin laminated glass panels for vehicular applications with an external glass having a thickness less than or equal to 1 mm. and a non-chemically-strengthened glass sheet less than or equal to 2.5 mm. The disclosure highlights a laminated panel which claims superior impact resistance in response to impact events external to a vehicle, yet appropriately dissipates energy and appropriately fractures in response to impact event from the interior of the vehicle.

U.S. Pat. Publication No. 2013/0127202 published May 23, 2013 discloses glass laminates comprising at least one layer of strengthened glass having a first surface and a second surface disposed opposite the first surface, and one or more coatings adhered to the first surface of the strengthened glass, wherein the one or more coatings impart an asymmetric impact resistance to the glass laminate.

U.S. Pat. Publication No. 2013/0209751 published Aug. 15, 2013 discloses an alkali-aluminosilicate glass for 3D precision molding and thermal bending. The glass has a working point lower than 1200 degrees C. and a transition temperature lower than 610 degrees C.

U.S. Pat. Publication No. 2013/0295357 published Nov. 7, 2013 discloses a glass laminate with a chemically-strengthened, inner glass sheet with a thickness of 0.5 mm. to 1.5 mm. laminated to a non-chemically strengthened external glass sheet (annealed) with a thickness ranging from about 1.5 mm. to about 3.0 mm. The thicknesses of the sheets within the laminated assembly are of exemplary thinness to provide superior resistance to impacts and a reduction of weight for vehicular glazing with drawings of a curved glass embodiment illustrating a chemically-strengthened glass sheet that is larger in size than the non-chemically strengthened (annealed) glass sheet.

Pat. Application No. WO2014209861A1 published Dec. 31, 2014 discloses thin light-weight laminated glass panels with improved performance for vehicular applications resulting from an annealing process after ion-exchange. Laminated glass panels are disclosed in which at least one chemically-strengthened glass layer in the assembly has an enhanced depth of compressive stress of greater than about 60 microns to resist environmental damage as well as a reduced level of surface compressive stress between about 250 MPa. and about 350 MPa. for easier breakage if a vehicle occupant impacts the glass panel thereby reducing the risk of blunt force injury.

Pat. Application No. WO2015031594A2 published Mar. 5, 2015 discloses thin light-weight laminated glass panels with improved performance in external impact resistance, but with a controlled or preferential breakage behavior when impacted from the interior of the vehicle to minimize injury to the vehicle occupant. Laminated glass panels are disclosed with strengthened sheets having chemically-polished surfaces and a coating formed on one surface adjacent the interlayer to create a weakened surface. Additionally, a thin curved laminated glass panel is disclosed having a curved annealed glass sheet laminated to a chemically or thermally strengthened glass sheet which has been cold-formed to impart different compressive stresses for achieving a desired breakage behavior.

Despite the numerous prior attempts at perfecting heat-treated, bent glass laminates, the disadvantages or weaknesses associated with conventional glass panels are ubiquitous. A conventional bent, laminated fully-tempered glass panel provides the undesirable characteristic of poor quality on perimeter edges and perforations, such as holes or notches, with misalignment and obtrusive overhangs. A conventional bent laminated fully-tempered glass panel is typically characterized by higher levels of transmissive distortion with dissimilar symmetry between sheets, requiring an increased polymer interlayer thickness to fill gapping between bent glass sheets. The resulting irregular polymer interlayer thickness is likely to produce an undesirable lens effect and makes the dull plastic interlayer along the approximate centerline thickness even more visible. Production methods for conventional, bent laminated, fully-tempered glass panels are inefficient, requiring the repetitive fabrication of individual, bent fully-tempered, glass sheets and the potential risk of costly delamination resulting from the application of high forces to unitize the laminated assembly.

The avoidance of the above-mentioned difficulties is our design goal. Additionally, the high edge quality and enhanced strength of bent, single layer, fully-tempered glass is desirable but without the risk of particles dislodging and subsequent disintegration caused by the explosive release of internal residual stresses in the event of breakage including that which may occur spontaneously. The concurrent maintenance of desirable optical and aesthetic qualities, notably the avoidance of optical distortion and lens effects, as well as the avoidance of obtrusive overhangs and interlayer visibility at perimeter edges and perforations, remain highly desirable. The creation of such an improved bent glass, heat-treated laminate is the focus of our invention.

SUMMARY OF THE INVENTION

We have designed and produced a heat-treated, heat-strengthened or fully-tempered, laminated bent glass product that overcomes the problems discussed above. The improvement provides bent, laminated and heat-treated glass panels suitable for use as an enhanced safety glazing material in architectural and interior applications, and a method of making them.

A heat-treated, fully-tempered bent glass substrate, characterized as having a surface compressive stress of at least 69 MPa., is encapsulated on one or both of its major faces by a thin chemically-strengthened, glass veneer sheet. If less final strength is required in the panel, a heat-strengthened bent glass substrate, which as defined broadly is characterized as having a surface compressive stress of at least 24 MPa., may be substituted in place of the fully-tempered glass. In the best mode, alkali-aluminosilicate glass is preferred for the glass veneer sheets. However, another alkali-containing glass recipe such as a soda-lime silicate, alkali-borosilicate glass, alkali-aluminoborosilicate glass, alkali-boron glass, alkali-germinate glass, and alkali-borogermanate glass may be substituted for the glass veneer sheet.

In each case the glass veneer sheet is formed by cold-bending over a polymer interlayer, and then permanently laminated to form a protective barrier on the heat-treated glass. The glass veneer sheet and polymer interlayer dampens the explosive release of its internal residual stresses in the event of breakage to the bent glass substrate, preventing glass particles from dislodging and subsequent disintegration of the heat-treated glass.

Manufacture of a preferred product commences with production of a single, bent, fully-tempered glass sheet that forms a substrate having a preferred thickness of between 5.5 mm. and 19.9 mm., but which may be as thin as 3.2 mm. A single, bent, heat-strengthened glass sheet may be substituted for the fully-tempered glass sheet if less strength in the final laminated panel is required. Production of the heat-treated sheet to the required final panel size is completed in accordance with standard industry tolerances. The bent glass substrate may include a low-emissivity and/or reflective coating. Alternatively an applied ceramic-frit paint, which is baked into the glass surface during the heat-treating process, may be employed. The heat-treated bent glass substrate is not required to match another individually manufactured heat-treated glass sheet, since there is only a single heat-treated bent glass sheet in the permanently laminated glass assembly.

Following production, the heat-treated bent glass sheet is then carefully measured to define its "as manufactured" tolerances. Careful and precise measurements of the face of the bent glass substrate are required. Careful and tedious analog measurements using paper templates, plastic imprints, or a ruler can suffice. Digital measurement methods employing optical, non-contact scanners with laser beams or white light, or alternately a CMM coordinate measuring machine, are preferred for generating precise point measurements. These measurement devices have reached a maturity and cost to become an efficient means by which to quickly measure a bent glass substrate with a high degree of accuracy and precision. This measurement data for the bent glass substrate includes not only the position and profile of the perimeter edges, but also the locations and sizing of perforations such as holes or notches.

Chemically-strengthened glass sheets for use as the glass veneer sheets on the face of the bent heat-treated glass sheet can then be fabricated. The preferred glass veneer sheet is chemically-strengthened by an ion-exchange process and its thickness is optimized for sheet size, normally in a range of 0.4 mm. to 1.1 mm. thickness. Some glass veneer sheets are as thin as 0.28 mm. or as thick as 3.0 mm.

The glass veneer sheet is fabricated from raw sheets of alkali-containing glass to sizes congruent with the preexisting bent, heat-treated bent glass substrate. The raw glass for use as the glass veneer sheets can be cut to size and perforated using a number of methods including laser cutting, water-jet cutting, score/break, and abrasive grinding. However, the preferred method for cutting, and if required the adding of perforations including holes or notches, is by ultra short pulse Picosecond or Femtosecond laser to yield edges of high quality without chipping. Edge finishing may follow including etching with Hydrofluoric acid and/or abrasive grinding, with or without an arris chamfer. Optional hot bending in a furnace to thermally pre-form to a shape approximately matching that of the heat-treated bent glass substrate, may be undertaken. The glass veneer sheet is strengthened by ion-exchange, most preferably as the final step in the fabrication processes.

In assembly, the chemically-strengthened glass veneer sheets may be clamped to the existing heat-treated bent glass substrate on one or both faces. A polymer interlayer is predisposed between the major surface of the bent glass substrate and any glass veneer sheet. Chemically-strengthened glass veneer sheets are preferably presented with the optimal perimeter and perforation dimensions for immediate assembly. However, chemically-strengthened glass veneer sheets may in some cases be oversized. Oversize glass veneer sheets may be matched to the fully-tempered bent glass substrate by careful preassembly and disassembly before lamination, followed by additional cutting of perimeter edges or perforations. The latter steps are optionally followed by further ion-exchange to increase surface compression and avoid a reduction in glass veneer sheet strength. Alternately chemically-strengthened glass veneer sheets may be left in an oversized condition for later size remediation after lamination. In both cases, remediation of the glass veneer sheet size must be completed without prohibited dimensional alterations to the already heat-treated, thick bent glass substrate.

A lamination interlayer is disposed between the heat-treated bent glass substrate and the chemically-strengthened glass veneer sheet. An adhesion promoter, such as silane, may be pre-applied to the glass surfaces which adjoin the interlayer. Lamination follows with a polymer interlayer of PVB polyvinyl butyral, ionoplast, EVA ethyl vinyl acetate, TPU Thermoplastic polyurethane, polycarbonate, urethane, CIP cast-in-place curable resins, or other plastic materials and combinations thereof to permanently bond the glass veneer sheet in its cold-bent state with the heat-treated bent glass substrate. The preferred lamination method involves placing a plastic sheet with a consistency resembling linoleum between the glass layers. The assembly, enclosed within a vacuum bag, is then inserted into an autoclave for the timed application of heat and pressure, permanently fusing the assembly into a unitary panel. An alternate method is the pouring of plastic in a liquid form between the glass layers and then solid curing the plastic by chemical or ultraviolet means. However, autoclaved PVB or ionoplast interlayers are the preferred lamination mode for this invention. The polymer interlayer remains substantially uniform in thickness during the lamination process because the thinness of the chemical-strengthened glass veneer sheet allows it to readily flex to match the shape (and its inconsistencies) of the heat-treated bent glass substrate, thereby foregoing excessive thickness flow in the thickness of the polymer interlayer and the optical exaggerations that result.

Post lamination processing is desired to achieve the final edge finish. In cases where lamination has been undertaken with oversize glass veneer sheets, chemically-strengthened glass veneer sheets can be resized by cutting or adding perforations such as holes or notches or abrasive grinding without damage to the heat-treated bent glass substrate. Techniques such as laser cutting around perimeter edges or for perforations on already chemical-strengthened pieces by ultra short pulse Picosecond or Femtosecond laser are successful. Alternately, the depth of compressive stress may be reduced, for example to about 15 to 20 microns or less on sodium alkali-aluminosilicate, to allow for mechanical score/break cutting or abrasive grinding, though with an approximate 50% reduction of compressive strength within 20 mm. of the dimensional alteration. Dimensional changes to the glass veneer sheet after lamination result in an approximately 50% reduction to the strength of the glass veneer sheet from the level otherwise achievable were no dimensional changes completed after strengthening by ion-exchange. As a final step, excess polymer interlayer is trimmed by sharp instrument without damage or dimensional changes to the heat-treated bent glass substrate. The final removal of excess interlayer material leaves the polymer interlayer in a condition of minimal visibility at the ancillary side region of the thickness between the thin chemically-strengthened glass veneer sheet and the heat-treated bent glass substrate thereby forming an integrated unit exhibiting substantially smooth and uniform edges, providing an enhanced aesthetic appeal.

As a final step, testing of a representative sample of the final product for conformance to applicable laminated safety glass standards proceeds. The glass veneer sheet and polymer interlayer form a protective barrier over the heat-treated glass that dampens the explosive release of internal residual stresses in the event of breakage to the bent glass substrate, preventing particles dislodging and subsequent disintegration. The safe encapsulation of stresses within the heat-treated bent glass substrate prevents its immediate disintegration upon breakage into unbound individual glass particles which, for particular applications, may result in a potential risk of injury to those directly below. The high strength and generally larger breakage fracture pattern of the chemically-strengthened glass veneer sheet works in combination with the polymer lamination interlayer to create a barrier that prevents even small glass particles from departing the assembly in the event of explosive breakage and release of the stresses from within the heat-treated bent glass substrate. Additionally, enhanced strength compared to laminated, bent glass of the same thickness which has not been heat-treated, with especially deep compressive stresses at perimeter edges and perforations such as holes and notches, is realized. The use of the invention for other than architectural and interior applications is contemplated, for example appliances, electronics especially touch screens, and transportation glazing including overhead automotive sunroofs.

In the best mode, fabrication of the invention preferably commences with optical scanning of the surface(s) of the bent, fully-tempered sheet that will function as a bent glass substrate to obtain its dimensional properties. Then using digital sizing, the preferably alkali-aluminosilicate glass veneer sheets are fabricated to match the bent glass substrate, conforming to the convex and/or concave substrate surfaces. Alternatively, the separate step of cold-bending the alkali-aluminosilicate glass veneer sheets to match the bent glass substrate may be modified by applying a little more force to slightly change the shape of the heat-treated bent glass substrate especially if it is of a thinner thickness and thus slightly flexible. However, it is required that only the "minimal force to conform to the shape of the thick bent fully-tempered glass template" be applied during cold-bending of the glass veneer sheet, because regardless of the overall force applied, only a minimal amount of force is needed to unitize the assembly. Excessive force to unitize must be avoided.

A further modification includes the use of a thick, bent, and heat-strengthened glass for the substrate. Heat-treated, heat-strengthened glass, as defined more narrowly by industry standard ASTM C1048, is characterized as having a surface compressive stress of between 24 MPa. and 52 MPa. This approach foregoes strength in the heat-treated bent glass substrate but reduces the amount of residual stress encapsulated by the glass veneer sheet and polymer interlayer. Again the bent glass substrate is not required to be manufactured with optimal dimensions because, preferably, there is not more than one heat-treated glass sheet in the permanent assembly.

The preferred method for manufacturing a glass panel in accordance with the invention comprises the steps of: (a) fabricating a single, thick bent fully-tempered glass sheet to be used as a substrate (if less final strength is required then a bent heat-strengthened glass sheet may be substituted); (b) defining the dimensional characteristics for one or more glass veneer sheets; (c) fabricating at least one thin, strong chemically-strengthened glass veneer sheet of preferably alkali-aluminosilicate glass (another alkali-containing glass recipe such as a soda-lime silicate glass, alkali-borosilicate glass, alkali-aluminoborosilicate glass, alkali-boron glass, alkali-germinate glass, and alkali-borogermanate glass may instead be substituted); (d) assembling at least one thin chemically-strengthened glass veneer sheet onto the bent glass substrate, with a polymer interlayer placed therebetween, and cold-bending the glass veneer sheet so it mechanically conforms with minimal force to the shape of the major surface of the thick fully-tempered bent glass substrate onto which it is assembled; (e) laminating to permanently bond the one or more glass veneer sheets in their cold-bent orientation by polymer interlayer to the bent glass substrate; and (f) finishing by trimming of the polymer interlayer in planes extending from the edge finish of the bent glass substrate to impart the appearance of a solid edge.

In step "b" above the defining of dimensional characteristics for one or more glass veneer sheets is preferably achieved digitally through the steps of (i) measuring the thick bent fully-tempered glass sheet by scanning with an optical, non-contact scanner to generate many thousands of dimensional points, a "point cloud", representing its dimensional properties; and (ii) creating from such measurements a virtual dimensioned representation of the glass panel in Computer-aided Design software in which dimensional characteristics for one or more glass veneer sheets are developed and optimized so as to flushly mate after lamination with the major surface of the bent glass substrate, with perimeter edges which are flush with or smaller than the perimeter edges of the bent glass substrate; and with perforations such as holes or notches which are flush with or larger than perforations in the bent glass substrate.

The glass veneer sheet fabricating step (i.e., step "c" above) can involve various sequences selected from among the following steps: (i) cutting, (ii) adding perforations such as holes or notches (iii) optionally hot bending in a furnace to thermally pre-form to a shape approximately matching that of the heat-treated bent glass substrate, and (iv) strengthening by ion-exchange. The cutting or adding perforations such as holes or notches is preferably by ultra short pulse Picosecond or Femtosecond laser.

The finishing step (i.e., step "f" above) may include cutting or adding perforations such as holes or notches or abrasive grinding to one or more thin glass veneer sheets. Dimensional changes to the glass veneer sheet after lamination result in a reduction to the strength of the glass veneer sheet from the level otherwise achievable were no dimensional changes completed after strengthening by ion-exchange. The final dimensional characteristics of each thin, alkali-aluminosilicate chemically-strengthened glass veneer sheet are preferably optimized so its perimeter edges are flush with or smaller than the perimeter edges of the thick, fully-tempered bent glass substrate and perforations such as holes or notches are flush with or larger than the perforations of the thicker bent glass substrate.

Thus a basic object of our invention is to provide an improved, heat-treated, bent glass laminate and methods of economically manufacturing them.

It is also an important object to minimize misalignment in the edge of component layers. It is a feature of our invention that the dimensional sizes of the glass veneer layers can be optimized for enhanced alignment without prohibited dimensional alterations to the heat-treated bent glass substrate.

Another object is to provide a laminated, heat-treated glass panel for use in safety glazing applications, especially those instances where deep compressive stresses along perimeter edges or perforations are desirable.

Similarly, it is an object of our invention to provide bent glass panels optimally suited for use as a glazing material in architectural and interior applications where a single, fully-tempered safety glass presents unacceptable risk of falling particles or where the quality of current methods for producing bent heat-treated laminated glass are unacceptable.

A related object is to aesthetically bond a glass veneer sheet to a heat-treated, heat-strengthened or fully-tempered, bent glass substrate.

Similarly it is an object of our invention to provide an improved bent glass, laminated panel with a glass veneer sheet preferably crafted from large sheets of alkali-aluminosilicate glass.

Further, it is a goal to fabricate ultra-thin glass veneer sheets without chipping the edges or breaking the structure.

A related object is to make a fully-tempered glass piece safer in the event of breakage.

Yet another object is to provide a bent glass laminate of the character described exhibiting a less obtrusive edge appearance. It is a feature of our invention that the interlayer is located at the lateral side of the glass edge, making the often tacky dull band of polymer less noticeable.

It is a further object of our invention to provide a bent and laminated glass panel which exhibits outstanding edge quality and optical transparency.

Another basic object is to laminate a single fully-tempered glass piece with chemical-strengthened glass sheets of another alkali-containing glass recipe including those of soda-lime silicate glass, alkali-borosilicate glass, alkali-aluminoborosilicate glass, alkali-boron glass, alkali-germinate glass, or an alkali-borogermanate glass.

A related object is to provide a glass panel of the character described wherein optical quality is excellent. It is a feature of our invention that the heat-treated bent glass substrate is produced as single monolithic panels to which the chemically-strengthened glass veneer sheets conform.

Another related object is to minimize perceived optical waviness. It is a feature of our invention that the plastic interlayer thickness is substantially uniform and therefore minimizes optical distortions.

It is another object of the invention to provide a means for cushioning laminates of the character described during manufacturing for compensating for thermal expansion.

A further object is to minimize collateral damage from breakage. It is a feature of our invention that, if broken, the glass remains substantially structurally intact, since fragments are bound together by the resilient plastic interlayer and the chemically-strengthened glass veneer sheet, which serves as a shield safely encapsulating the residual stress within the thick heat-treated bent glass substrate that otherwise disintegrates with particles dislodging in the event of its breakage.

A still further object is to minimize the risk of later delamination. It is a feature of our invention that only minimal force is required to unitize the component sandwich.

Another object is to allow coatings including those with low-emissivity and/or reflective properties from already coated commercial raw flat glass sheets to be incorporated into the panel without an absence of surface compression in the coated surfaces.

A still other related object is to allow for the application of ceramic-frit paint to be incorporated into the panel without an absence of surface compression in the painted surfaces.

A related object is to provide methods for economically manufacturing heat-treated, bent glass, laminated panels of the character described.

Another important object is to provide laminated, bent glass panels of the character described that are ideal for use in architectural and interior applications.

Another object of this invention is to provide an improved glass panel suitable for use in other applications including appliances, electronics especially touch screens, and transportation glazing including overhead automotive sunroofs. These and other objects and advantages of the present invention, along with features of novelty appurtenant thereto, will appear or become apparent in the course of the following descriptive sections.

BRIEF DESCRIPTION OF THE DRAWINGS

In the following drawings, which form a part of the specification and which are to be construed in conjunction therewith, and in which like reference numerals have been employed throughout wherever possible to indicate like parts in the various views.

DETAILED DESCRIPTION OF THE DRAWINGS

Figure 1:
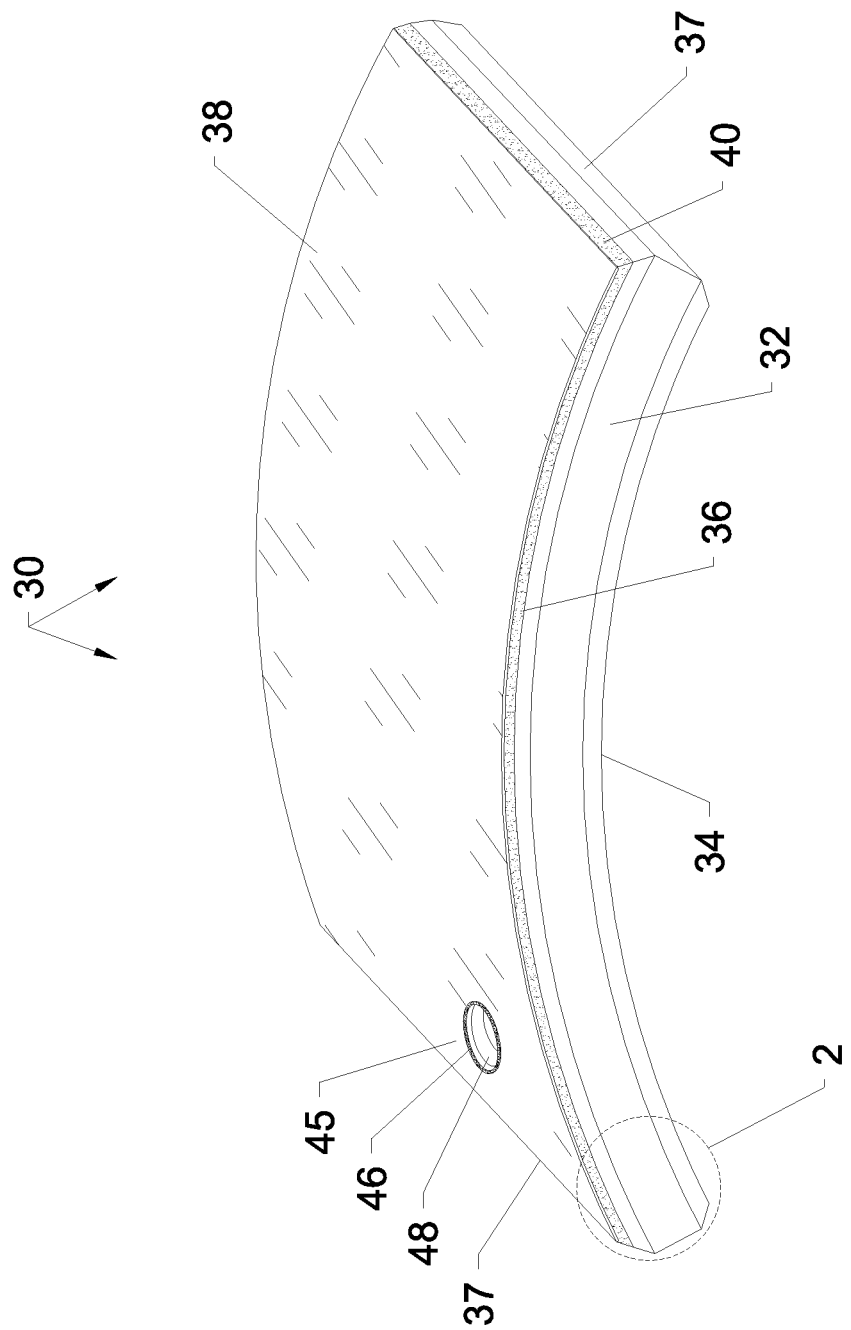
FIG. 1 is an isometric view of a bent, laminated and fully-tempered glass panel constructed in accordance with the best mode of the invention, showing the preferred glass veneer sheet laminated to a major external surface.
Figure 2:
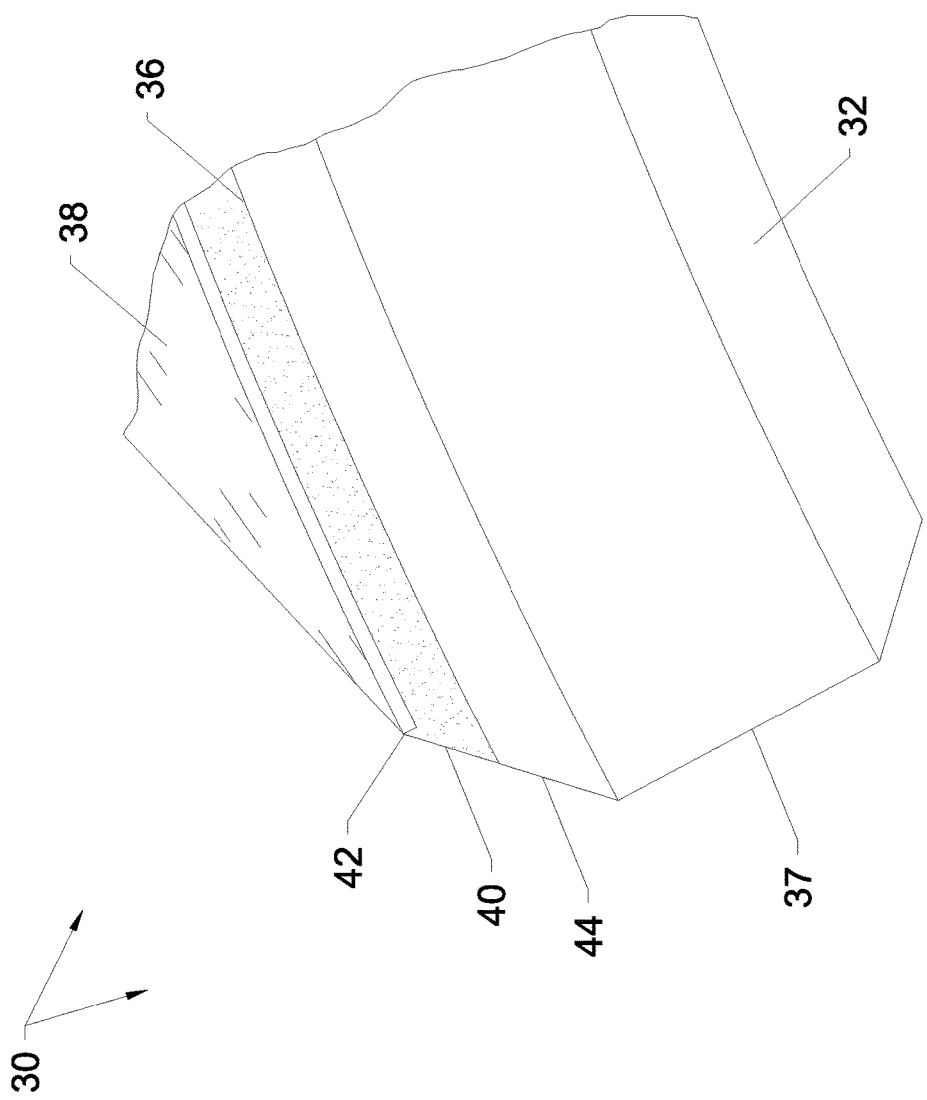
FIG. 2 is an enlarged, fragmentary isometric view derived from the circled corner region "2" in FIG. 1.

Turning now to FIGS. 1 and 2 of the appended drawings, a bent, laminated, glass panel constructed in accordance with the best mode of invention has been generally designated by the reference numeral 30. The panel 30 is ideal for use as an enhanced safety glazing material in architectural and interior applications. A generally arcuate, heat-treated and fully-tempered bent glass substrate 32, which comprises a single sheet of glass, has a lower exterior, major concave surface 34 spaced from an upper, exterior convex major surface 36. The perimeter edges 37 are preferably tapered. The single, thick bent, glass sheet forming the bent glass substrate 32 has a preferred thickness of between 5.5 mm. and 19.9 mm., but may be as thin as 3.2 mm. thickness. For maximum strength the bent glass substrate 32 is fully-tempered and characterized as having a surface compressive stress of at least 69 MPa. If less strength in the final panel is required, then the bent glass substrate 32 may be formed from a bent, heat-strengthened glass sheet which, as defined broadly, is characterized as having a surface compressive stress of at least 24 MPa. Heat-treated, heat-strengthened glass, as defined more narrowly by industry standard ASTM C1048, is characterized as having a surface compressive stress of between 24 MPa. and 52 MPa.

A relatively thin, chemically-strengthened glass veneer sheet 38 is laminated to the convex surface 36 of bent glass substrate 32 over a polymer interlayer 40. The polymer interlayer 40 may comprise a PVB polyvinyl butyral, ionoplast, EVA ethyl vinyl acetate, TPU Thermoplastic polyurethane, polycarbonate, urethane, CIP cast-in-place curable resins, or other plastic materials and combinations thereof suitable for permanent lamination. DuPont Butacite®, DuPont SentryGlas®, Bridgestone® EVA, Zircon 1000G®, or Uvekol® are common, commercially available interlayer materials.

The glass veneer sheet 38 is preferably an alkali-aluminosilicate glass as sold by a number of primary manufacturers under various trademarks and with various recipes which may be broadly categorized as sodium alkali-aluminosilicates and lithium alkali-aluminosilicates depending on composition. Gorilla Glass® (Code 2318 glass) is a trademark brand of thin, sodium alkali-aluminosilicate glass sheet manufactured by Corning Company of Corning N.Y. that is currently available in a thickness between 0.4 mm. and 2.0 mm., with 0.55 mm., 0.7 mm., 1.1 mm., and 2.0 mm. thicknesses being most common. Dragontrail® and LeoFlex® are trademark brands of thin sodium alkali-aluminosilicate glass sheet manufactured by Asahi Glass Co (AGC) of Japan, which are currently available in a thickness between 0.55 mm. and 3.0 mm., with 0.55 mm., 0.8 mm., 1.1 mm. and 1.3 mm. being most common. Xensation® Cover 3D is a trademark brand of thin lithium alkali-aluminosilicate glass sheet manufactured by Schott Glass Company of Germany, which is currently available in a thickness between 0.55 mm. and 2.0 mm.

A single, thick, heat-treated bent glass substrate 32 is commercially available for architectural and interior applications in sizes ranging from 152 mm.×152 mm. up to 2286 mm.×3200 mm. with some larger sizes available with specialized equipment. Alkali-aluminosilicate glass sheets, preferred for the glass veneer sheets, have long been commercially available in smaller "billet" sizes of approximately 813 mm.×610 mm. given their ubiquitous application as cover glass in the mobile telephone handset market. While most applications for bent safety glass do not require panels with sizes at the upper limits of those commercially available for bent heat-treated glass, sizes required are often substantially larger than traditional billet sizes utilized in the mobile phone market. For example in railing applications, a fully-tempered bent glass substrate 32 must typically meet dimensions of 1219 mm. to 1626 mm. in width, and 1067 mm. to 1524 mm. in height when installed as single monolithic glazing. Thus a thin, chemically-strengthened glass veneer sheet 38 must be minimally sized at 1219 mm.×1067 mm. to be a practical commercial solution for a bent glass railing application. However, alkali-aluminosilicate glass sheets have only just become commercially available in larger "stose" sizes of 1900 mm.×1500 mm., 2108 mm.×1679 mm., 1840 mm.×2500 mm., and indeed 2337 mm.×2500 mm. As such, alkali-aluminosilicate raw glass sheets have only recently become a practical ingredient to the disclosed innovative solution for an enhanced bent laminated heat-treated glass panel.

As best seen in FIG. 2, the thin glass veneer sheet perimeter edges 42 are flush with or smaller than the thicker bent glass substrate perimeter edges 37. Preferably the alkali-aluminosilicate glass veneer sheet 38 is between 0.4 mm. and 1.1 mm. thickness, but glass veneer sheets may be as thin as 0.28 mm. or as thick as 3.0 mm. Alkali-aluminosilicate glass recipes are preferred for use as the glass veneer sheets because when subject to a chemical-strengthening process, a high level of surface compressive stress as well as a high depth of compressive stress can be achieved relative to other alkali-containing glass recipes such as soda-lime silicate glass. While alkali-aluminosilicate glass is preferred for the glass veneer sheet, another alkali-containing glass which can be chemically-strengthened may be substituted provided such glass is sufficiently thin for flexibility but without fragility. Examples of other such alkali-containing glasses include soda-lime silicate glass, alkali-borosilicate glass, alkali-aluminoborosilicate glass, alkali-boron glass, alkali-germinate glass, alkali-borogermanate glass, etc. However it must be noted the high levels of surface compressive stress possible with alkali-aluminosilicate glass recipes is problematic to achieve with soda-lime silicate glass recipes. In addition, the chemical-strengthening process for soda-lime silicate glass takes a considerably longer period of time to achieve a given level of surface compressive stress as well as depth of compressive stress compared to alkali-aluminosilicate glass with the same process parameters.

It is also preferred that the glass veneer sheet edges 42 align with the tapered edges of the polymer interlayer 40 and bent glass substrate 44. Recent advances in the technology of laser cutting glass by use of ultra short pulse lasers, namely a Picosecond or Femtosecond laser, have been employed for cutting small glass parts in the mobile handset market. Such laser cutting methods are well suited to improving the perimeter sizing and perforating of larger, thin glass sheets by yielding very tight cutting tolerances without chipping, on the order of +/−200 microns and even +/−100 microns. Such improved laser technology when reapplied to the fabrication of oversize thin glass sheets for use as a glass veneer sheet 38 allows for a high level of precise dimensional accuracy on the sizing of glass veneer sheet edges 42 necessary to produce a final bent laminated glass assembly exhibiting a marked quality improvement to perimeter edges and perforations. Preferably the glass veneer sheet 38 with highly accurate sizing is laminated with the polymer interlayer 40 to the upper convex surface 36 of the thicker bent glass substrate 32.

Cutting by ultra short pulse laser, namely a Picosecond or Femtosecond laser, is the preferred method for quickly achieving a high level of dimensional accuracy, and for inserting perforations including holes notches and cutouts, while maintaining a pristine edge finish without chipping. The glass veneer sheet edges 42 may be optionally finished by etching with Hydrofluoric acid and/or abrasive grinding, with or without an arris chamfer. Chipping of the glass veneer sheet edges 42 must be avoided to prevent localized weakness in the edge which lowers the overall level of strength in the glass veneer sheet 38. The glass veneer sheet may or may not be hot bent in a furnace to thermally pre-form to a shape approximately matching that of the heat-treated bent glass substrate 32. The glass veneer sheet is chemically-strengthened by an ion-exchange process, most typically submersion of the glass in a salt bath, where alkali metal ions with a smaller atomic radius such as sodium or lithium vacate the glass surface and are replaced by larger alkali metal ions in the salt, typically potassium, which wedge into voids creating a high state of compression in the surface. The level of surface compressive stress as well as the depth of compressive stress are a function of the thermal history and thickness of the glass as well as the salt bath temperature, time of submersion, and the composition of the salt including contamination by the alkaline earth ions of Calcium (Ca) and Magnesium (Mg) which cause a well documented "blocking effect" to ion uptake "poisoning" the bath.

The strengthening by ion exchange of the glass veneer sheet 38 is preferably to a high level of surface compressive stress as well as with a high depth of compressive stress. The surface compressive stress in the glass veneer sheet 38 is preferably at least 100 MPa., at least 200 MPa., at least 300 MPa., at least 400 MPa., at least 500 MPa., preferably at least 600 MPa., and more preferably at least 700 MPa. Higher levels of surface compressive stress, in combination with higher depths of compressive stress, produce greater strength since tensile stresses from an impact must exceed the surface compressive stress at the tip of a flaw for a crack to propagate and result in breakage. The depth of the compressive stress in the glass veneer sheet 38 is preferably at least 10 microns, at least 20 microns, at least 30 microns, preferably at least 40 microns, at least 50 microns, and more preferably at least 60 microns. Higher depths of compressive stress also provide greater resistance to the relief of surface compression by abrasions or scratches which if deep enough may enter the tensile region and result in breakage. However care must also be taken to monitor corresponding tensile forces in the remainder of the thickness of the glass veneer sheet 38. The preferred level of central tension in the glass veneer sheet 38 is less than 70 MPa., less than 60 MPa., less than 50 MPa., preferably less than 40 MPa., and even more preferably less than 30 MPa. Higher levels of central tension provide stored energy to propagate fracturing if a flaw penetrates beyond the depth of compressive stress.

Chemically-strengthened glass veneer sheets 38 have desirable properties compared to glass veneer sheets of non-chemically-strengthened glass. Foremost, chemical-strengthened glass has a high level of strength suitable to encapsulate the energy released by the heat-treated bent glass substrate in the event of its breakage and release of residual stresses. Secondly, chemical-strengthened glass has a larger fracture pattern to contribute to structural integrity of the panel and prevent subsequent disintegration in the event of breakage to the heat-treated bent glass substrate including that occurring spontaneously. Chemically-strengthened glass has a highly compressed surface which resists light scratches in its own right while providing a reliable means to protect the polymer interlayer from environmental degradation. The exceptional strength of chemically-strengthened glass allows very thin glass to be utilized as the glass veneer sheet. Thin glass has maximum aesthetic appeal because of its limited obtrusiveness on the thickness when laminated to the major surface of the thick heat-treated bent glass substrate. Additionally, the thin glass has enhanced flexibility since the rigidity of a glass sheet decreases with thickness. The combination of high strength and thinness allows mechanical flexing in a cold-state to exactly conform with minimal force to the shape of the bent glass substrate which is not possible with other glasses that are thicker and thus more rigid and/or less compressively stressed at the surface and thus more fragile.

Particular attention must be directed to optimal glass veneer sheet sizing for proper assembly to the existing, bent glass substrate 32. Perforations including holes or notches in the chemically-strengthened glass veneer sheet may be oversized so structural forces are transmitted principally to the heat-treated bent glass substrate 32 with its more robust depth of compressive stress and not directly to the chemically-strengthened glass veneer sheet edges 42. Glass veneer sheet sizing is preferably slightly smaller around the perimeter edges than the heat-treated bent glass substrate so as to be inset from the main edge of the resulting laminated product, thereby shielding the glass veneer sheet along its more vulnerable edges which have shallower compressive stresses. The optimal final size of the chemically-strengthened glass veneer sheet conforms to the face size of the bent glass substrate equal to, or preferably just inset of, the final polished edge. The glass veneer sheet edges 42 are thus protected from accidental damage which may otherwise result in chipping or abrasions or scratches as well as transferring higher mechanical forces along the edges principally to the bent glass substrate 32. The potential for breakage is lessened while enhancing the aesthetic appeal of the final glass panel. The visibility of the interlayer plastic on the panel edge is minimized, providing for an edge more similar in appearance to that of a monolithic single piece of bent fully-tempered glass.

Chemically-strengthened glass veneer sheets can typically be flexed to mechanically conform with minimal force to the shape of a heat-treated bent glass substrate without the requirement of being first hot bent in a furnace to thermally pre-form the shape. Through mechanical flexing various shapes are accommodated. Cylindrical shapes can be readily achieved by flexing the glass veneer sheet along a single axis. For example, it has been found by experimentation that a chemically-strengthened glass veneer sheet with a 0.85 mm. thickness, and of an alkali-aluminosilicate recipe with a surface compressive stress of 700 MPa. and a depth of compressive stress of 45 microns, can be cold-bent to a cylindrical shape with a radius of curvature as tight as 150 mm. without an excessive incidence of failure. Where cylindrical shapes are required with an even tighter radius of curvature, or where a curve is moderate and along two opposing axis such as a spherical or compound shape, it is noted the chemically-strengthened glass veneer sheets may be hot bent in a furnace to thermally pre-form to a shape approximately matching that of the heat-treated bent glass substrate, and then mechanically flexed to final shape in identical conformance with the bent glass substrate. Although the heat-treated bent glass substrate may have dimensions deviating from optimal because of manufacturing imperfections, the glass veneer sheet surfaces conform to the bent glass substrate without application of excessive force.

For glazing hardware attachment to the glass panel, especially in frameless installations, there may be perforations 45 (FIG. 1) formed near the structure corners that penetrate the glass veneer sheet 38, the interlayer 40, and the substrate 32. The perforations are chambered as indicated by reference numeral 46. That portion of the perforation 45 proximate and through the glass veneer sheet 38 and the interlayer 40 is larger than the perforation diameter 48 through the major thickness of the bent glass substrate 32. The dimensional characteristics of each thin, chemically-strengthened glass veneer sheet are optimized to flushly mate with the major surface of the thick glass sheet to which it is laminated. It is important that glass veneer sheet perimeter edges 42 are flush with or smaller than the perimeter edges 37 of the thicker bent glass substrate 32, and that perforations 45 (and other holes or notches) are flush with or larger than the perforations 48 of the thicker bent glass substrate 32. Purposeful reduction of the size of the arris chamfer 44 on the perimeter edges 37 of the thicker bent glass substrate 32 which adjoin the glass veneer sheet 42 in order to more identically impart the simulated appearance in the bent, laminated, fully-tempered glass panel of a monolithic edge as found in a single fully-tempered glass pieces is contemplated.

Figure 3:
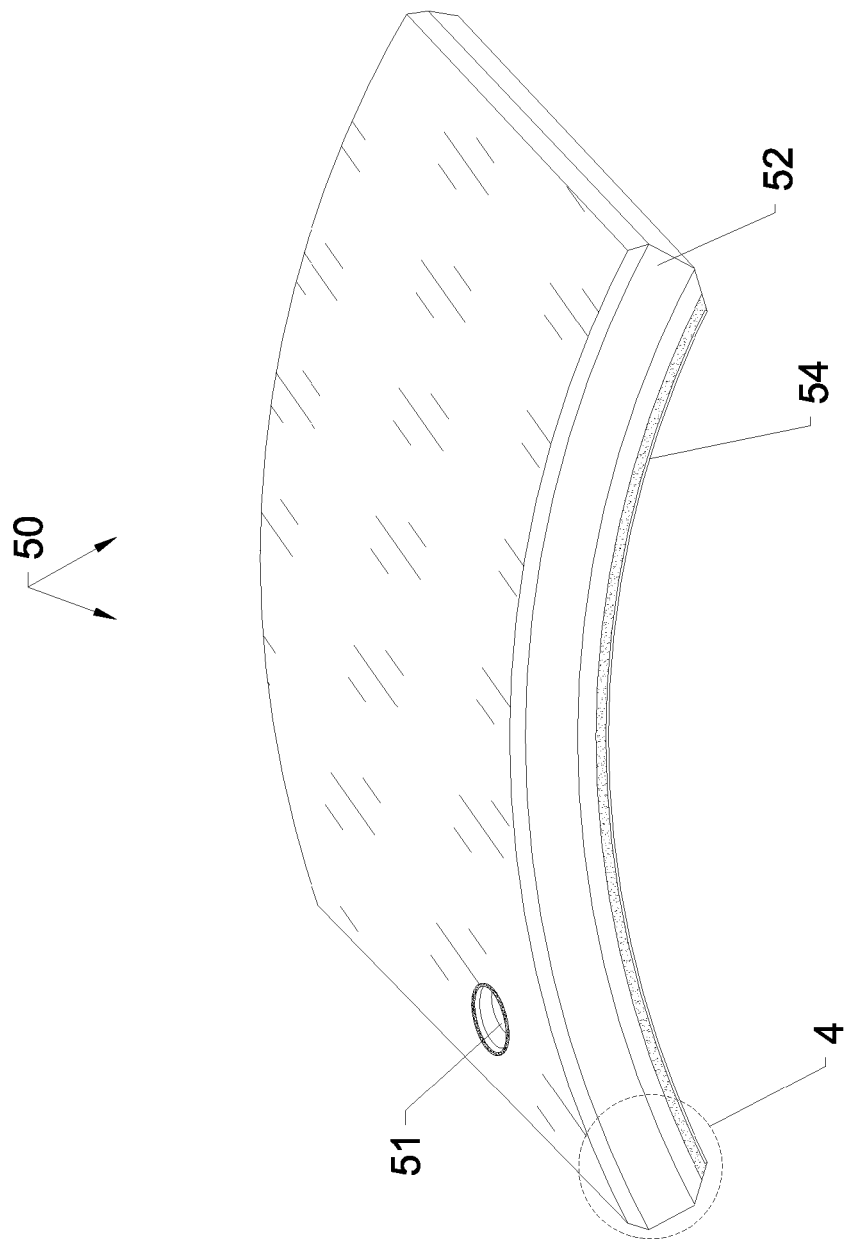
FIG. 3 is an isometric view of a bent, laminated and fully-tempered glass panel similar to FIG. 1, but showing the preferred glass veneer sheet laminated to a major internal surface.
Figure 4:
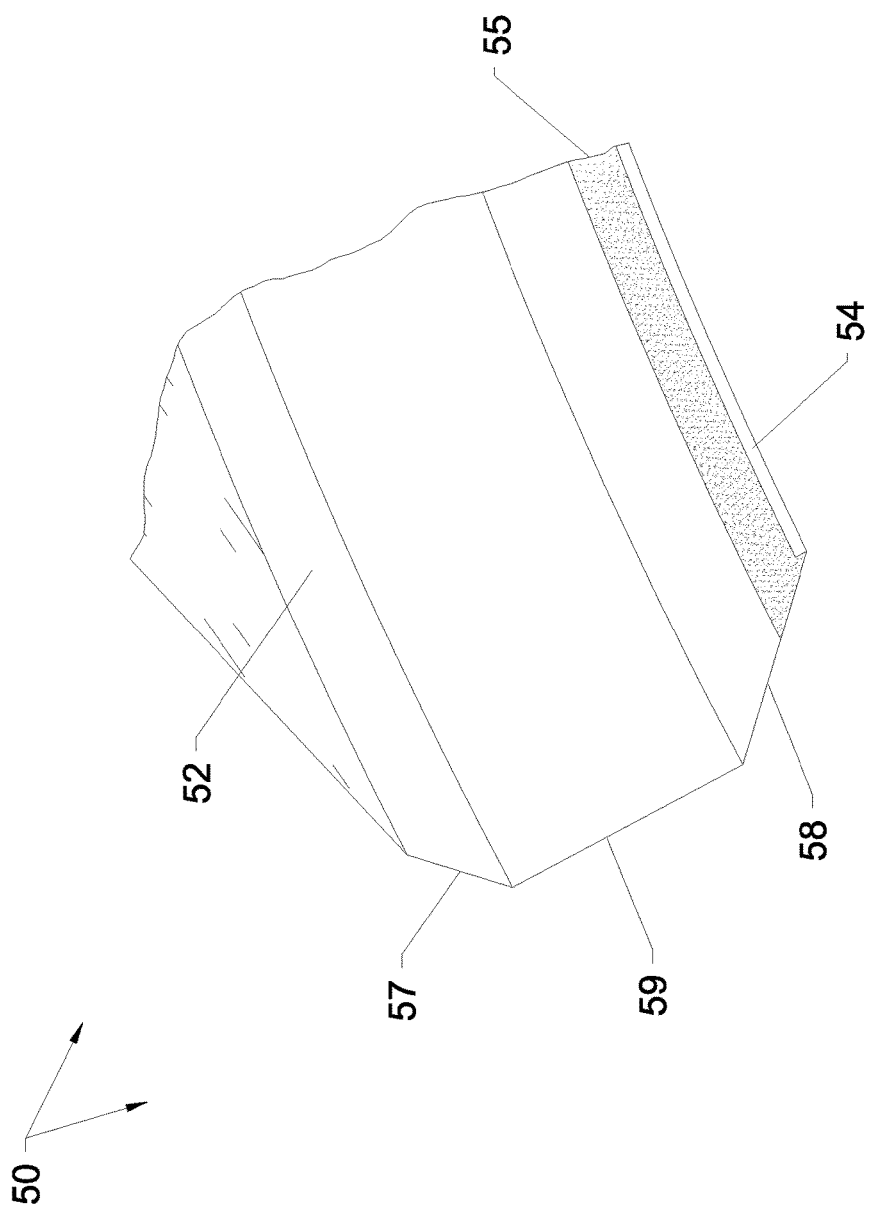
FIG. 4 is an enlarged, fragmentary isometric view derived from the circled corner region "4" in FIG. 3.

FIGS. 3 and 4 illustrate an alternative panel 50 comprising a heat-treated or fully-tempered bent glass substrate 52 and a lower glass veneer sheet 54 attached at the concave underside of the substrate 52. A polymer lamination interlayer 55 (FIG. 4) is sandwiched between the substrate 52 and the glass veneer sheet 54. Beveled end edges 57 and 58 border the substrate end 59. Purposeful reduction of the size of the arris chamfer 58 on the perimeter edges 59 of the thicker bent glass substrate 52 which adjoin the glass veneer sheet 54 to more identically impart the simulated appearance in the bent, laminated, fully-tempered glass panel of a monolithic edge as found in a single fully-tempered glass pieces is contemplated. Perforations 51 (FIG. 3) are constructed and dimensioned similarly to perforations 45 (FIG. 1) discussed above. Except for placement of the glass veneer sheet 54 on the bottom of the substrate 52, rather than the top as in FIGS. 1 and 2, panel 50 is similar to panel 30 seen in FIGS. 1 and 2.

Figure 5:
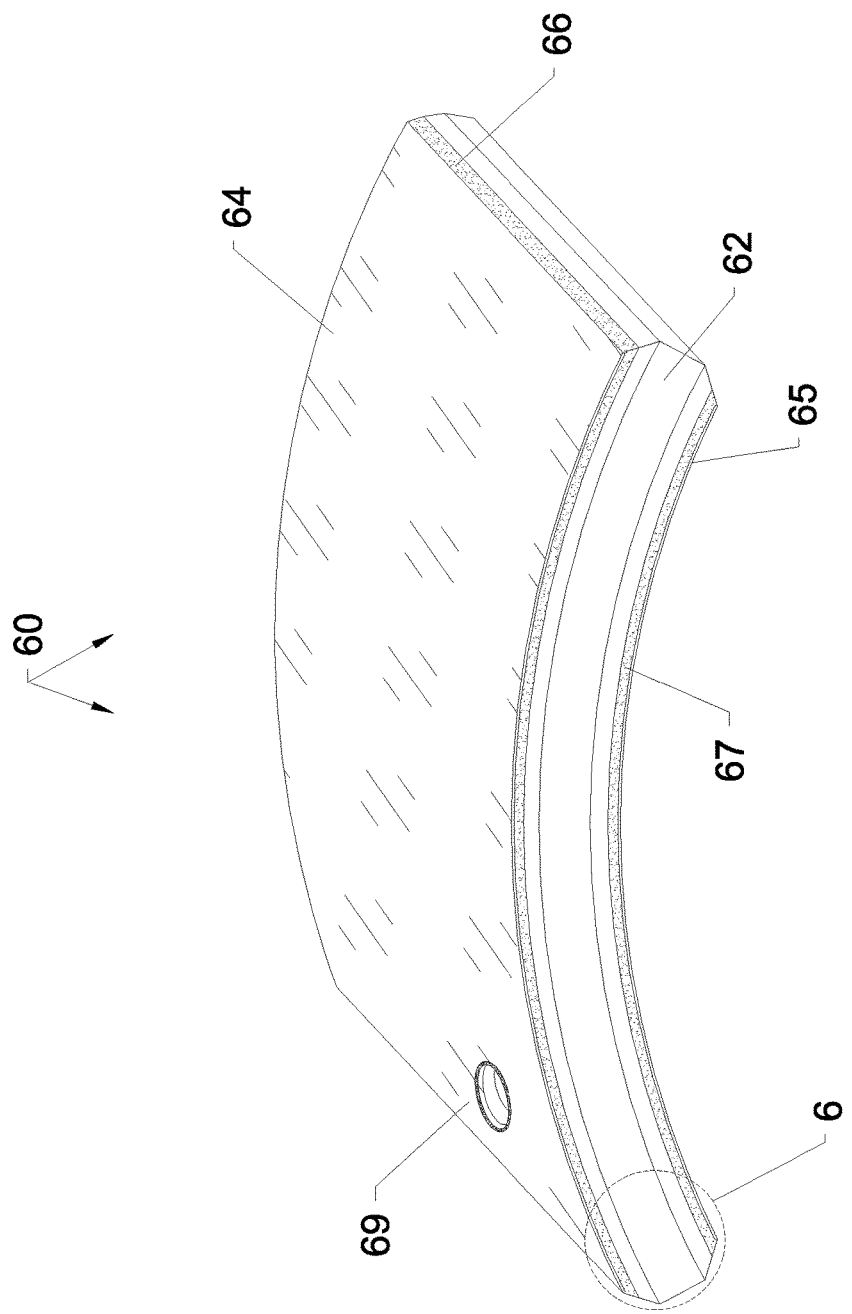
FIG. 5 is an isometric view of a bent, laminated and fully-tempered glass panel similar to FIGS. 1 and 3, but showing glass veneer sheets laminated to both internal and external surfaces.
Figure 6:
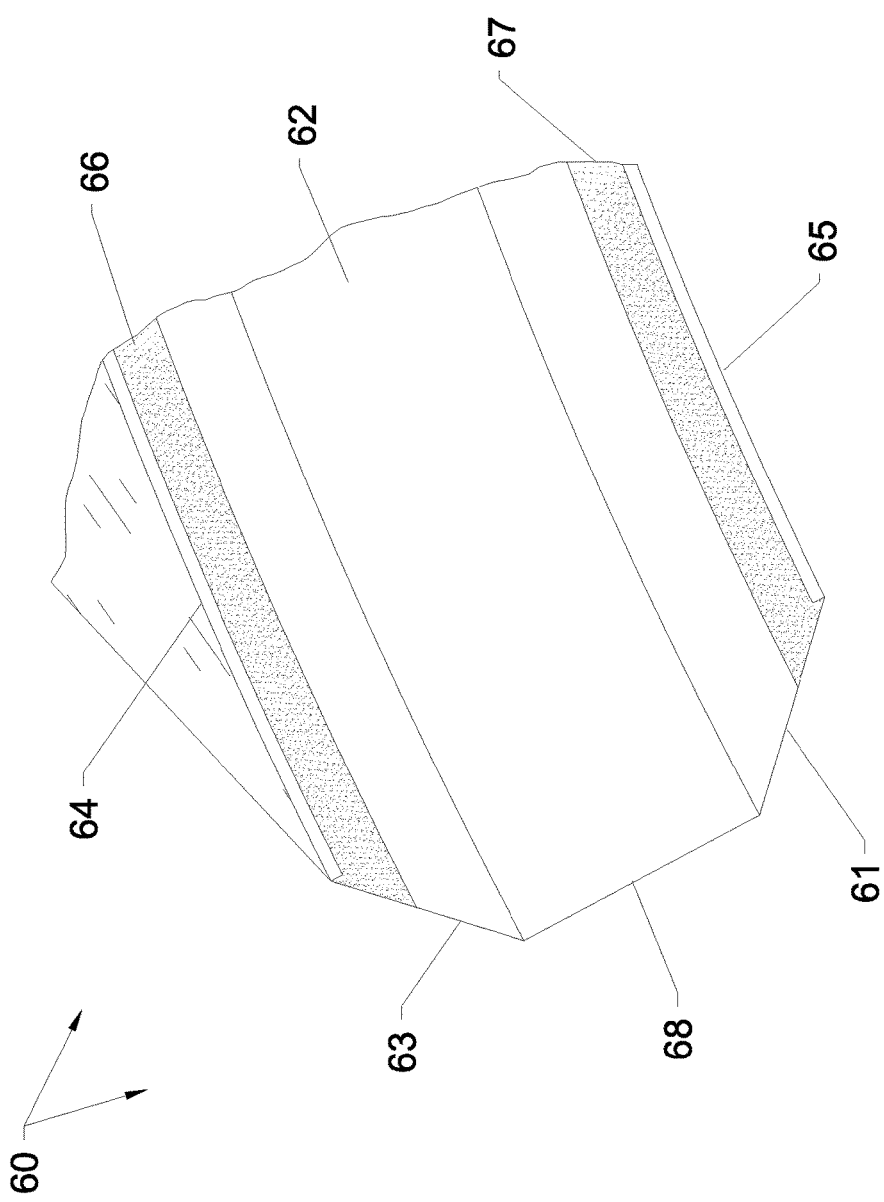
FIG. 6 is an enlarged, fragmentary isometric view derived from circled corner region "6" in FIG. 5.

An alternative, double-veneered panel 60 (FIGS. 5, 6) is similar to panels 30 and 50. Here glass veneer sheets are laminated to both major surfaces of the heat-treated or fully-tempered bent glass substrate 62 which has a convex top and a concave bottom. Glass veneer sheets 64, 65 are disposed on the top and bottom of substrate 62 over interlayers 66 and 67 (FIG. 6). Again there may be perforations 69 (FIG. 5) for glazing hardware attachment. Beveled end edges 61, 63 border the substrate ends 68 (FIG. 6). Purposeful reduction of the size of the arris chamfers 61, 63 on the perimeter edges 68 of the thicker bent glass substrate 62 which adjoin the glass veneer sheets 64, 65 to more identically impart the simulated appearance in the bent, laminated, fully-tempered glass panel of a monolithic edge as found in a single fully-tempered glass pieces is contemplated. The glass veneer sheet, interlayer and substrate dimensions and thicknesses are substantially the same as those disclosed in the above discussion of FIGS. 1-4.

Figure 7:
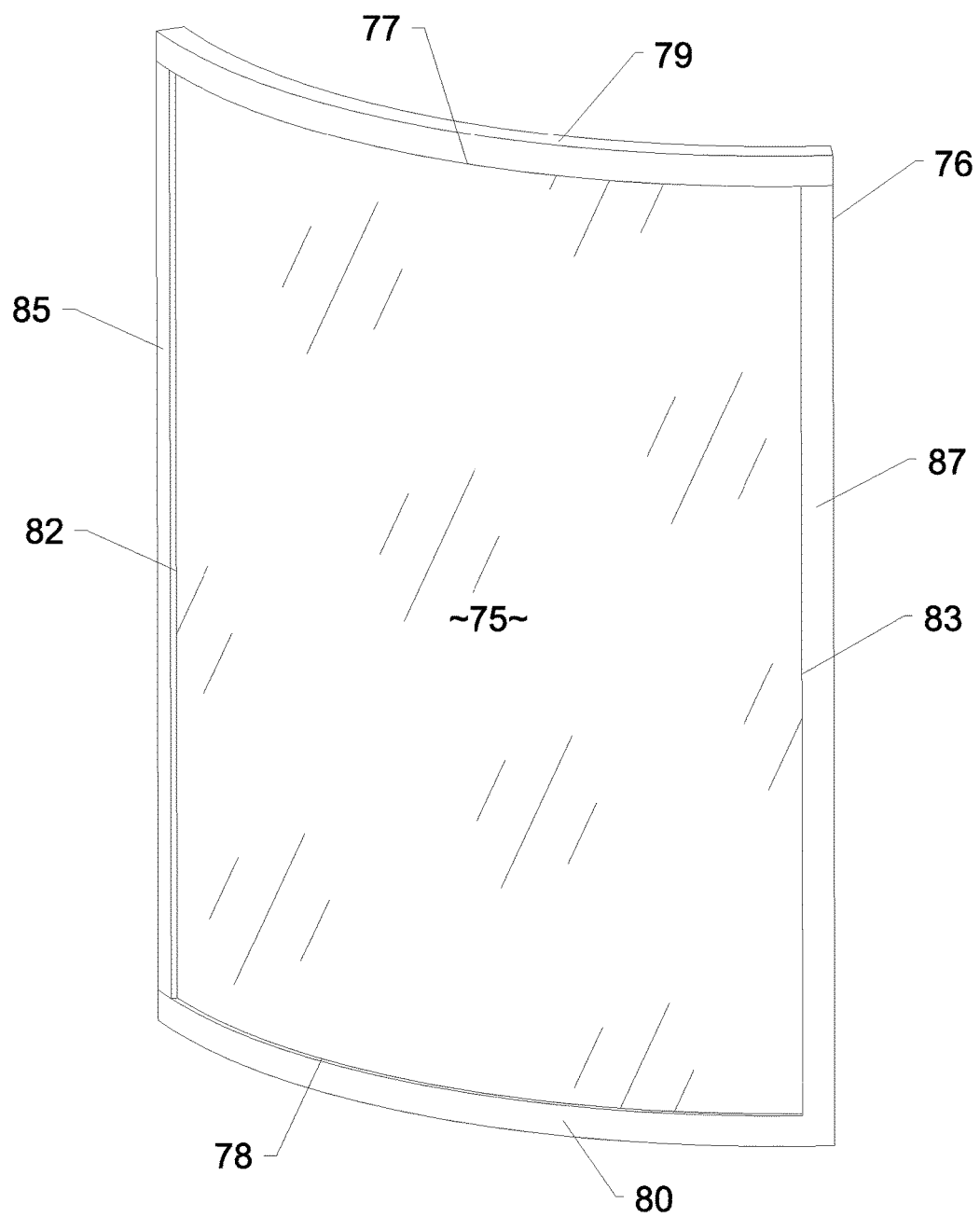
FIG. 7 is a frontal elevational view of a bent glass panel installed as a framed glazing.
Figure 8:
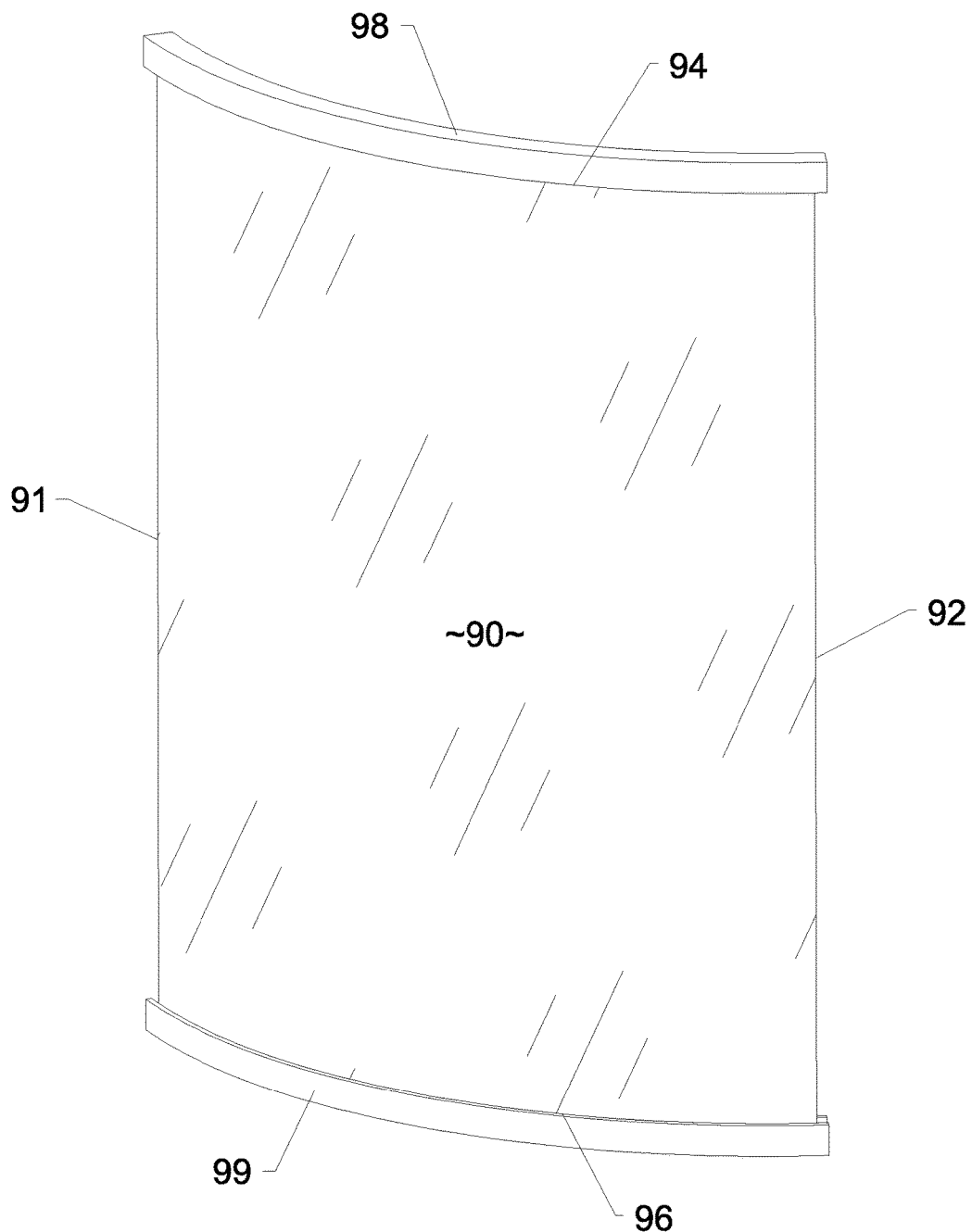
FIG. 8 is a frontal elevational view of a bent glass panel installed as semi-framed glazing.
Figure 9:
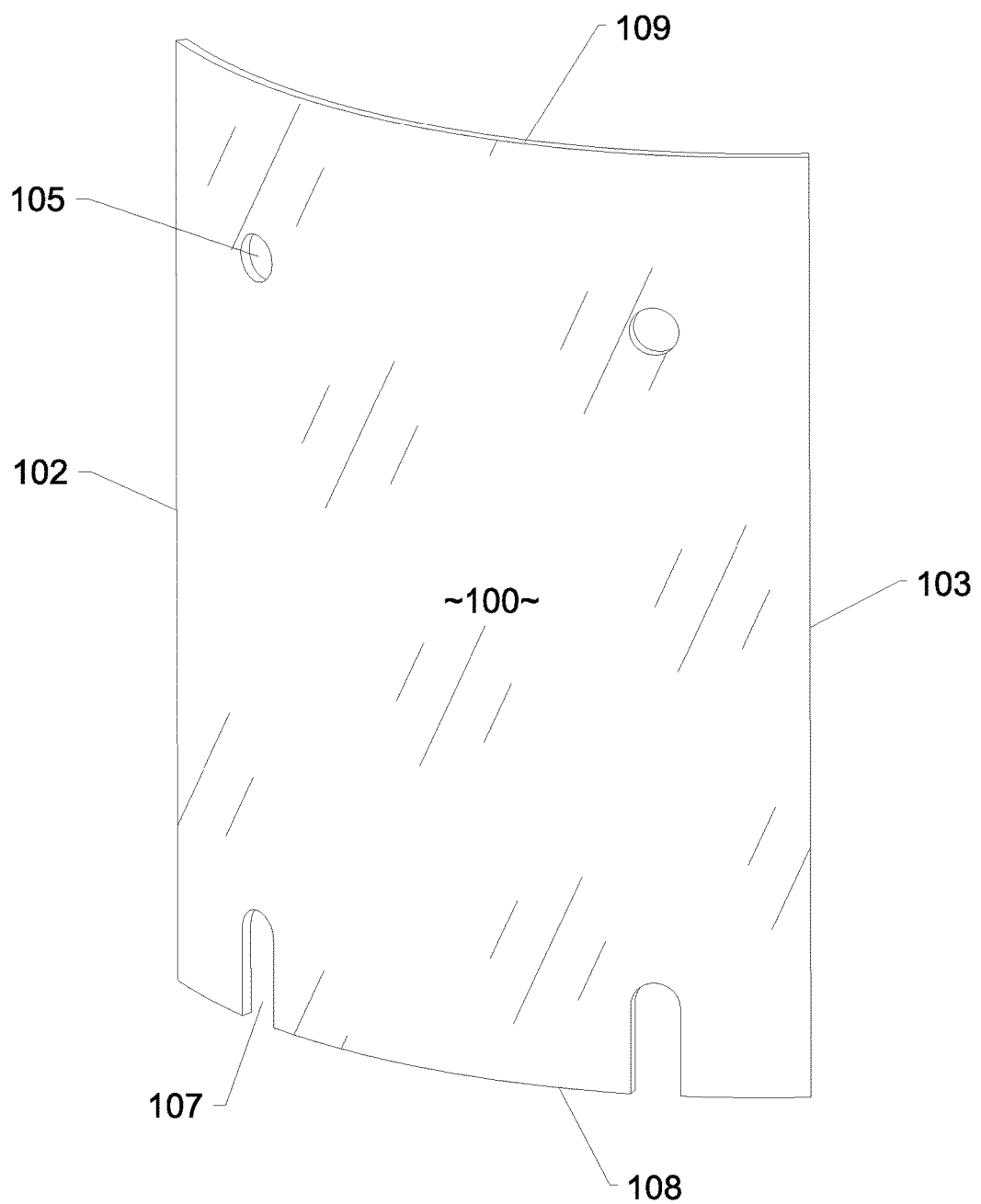
FIG. 9 is a frontal elevational view of a bent glass panel installed as frameless glazing.

FIGS. 7-9 illustrates bent glass panels installed as a glazing material. These panels are fitted or mounted to an opening through framed glazing, semi-framed glazing, or frameless glazing respectively. The framed glazing of FIG. 7 is a traditional manner of glazing whereby all perimeter edges of the bent glass panel are fully captured in a frame of wood, plastic, or metal. Thus in FIG. 7 the bent glass panel 75 is bounded by and captivated within a peripheral frame 76. The upper and lower fully captured edges 77 and 78 of the glass panel 75 are respectively captivated within the upper and lower frame components 79 and 80. Glass panel side edges 82, 83 are respectively captivated within the frame side components 85 and 87 (FIG. 7).

Semi-framed glazing of a bent glass panel 90 is illustrated in FIG. 8. In this arrangement fewer than all perimeter edges of the glass panel are captured in a frame, and fewer than all perimeter edges are fully exposed. The bent glass panel 90 has a pair of opposed, laterally spaced-apart edges 91 and 92 which are left uncovered and visible. However, the panel top 94 and bottom 96 are captivated within upper and lower frame members 98 and 99 respectively.

Frameless glazing (i.e., FIG. 9) has no framing at the perimeter edges of the bent glass panel 100, which may be mounted at points of support using hardware that clamps directly to the perimeter edges 102, 103, 108, or 109, or which penetrates perforations such as holes 105 or notches 107. The increasing use of frameless or semi-framed glazing requires a high quality, polished finish on exposed perimeter edges and around perforations for the clean fit of hardware attachments.

FIGS. 10-13 are cross sectional views of prior art that respectively illustrate heat-strengthened, fully-tempered, annealed, and chemically-strengthened bent glass sheets of potential suitability for use as substrates in accordance with this invention. Each type exhibits different levels of residual stress within the glass. The bent, heat-strengthened glass sheet 110 of FIG. 10, as defined broadly, is characterized as having a surface compressive stress of at least 24 MPa. Heat-strengthened glass, as defined more narrowly by industry standard ASTM C1048, is characterized as having a surface compressive stress of between 24 MPa. and 52 MPa. The opposed arrow symbols 111 diagrammatically indicate the residual compressive and tensile stresses in accordance with glass industry diagramming conventions. A perforation 112 is noted towards the left of the view.

Figure 10:
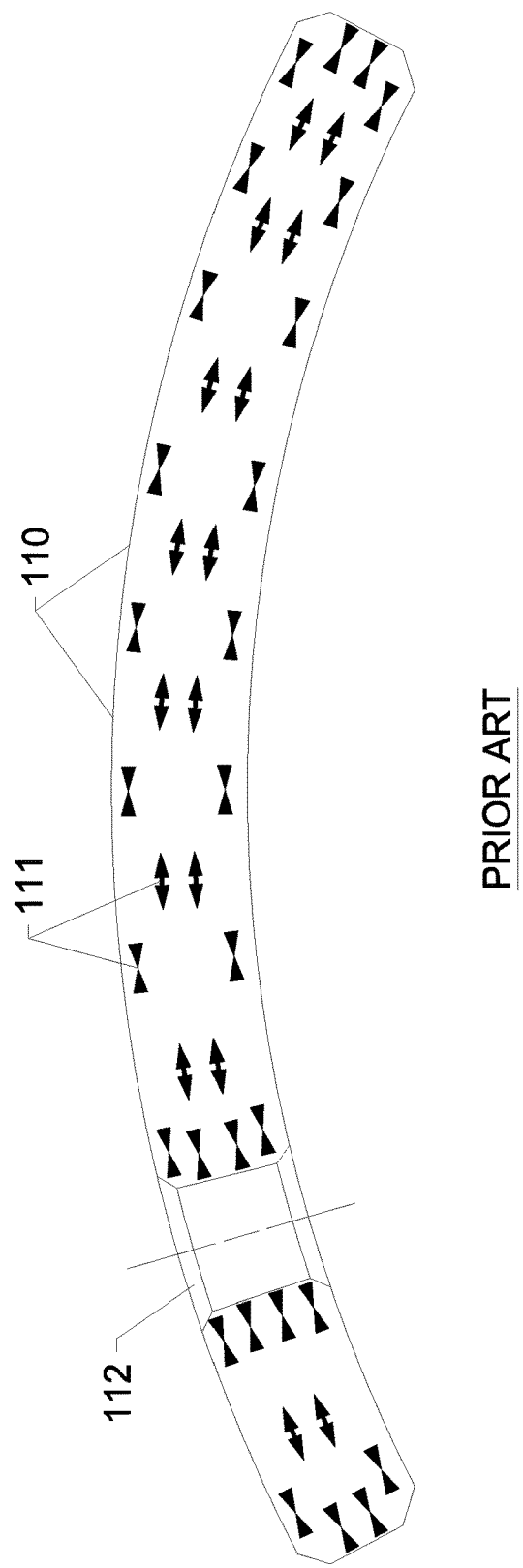
FIG. 10 is a longitudinal cross sectional view of a bent, heat-strengthened glass sheet.
Figure 11:
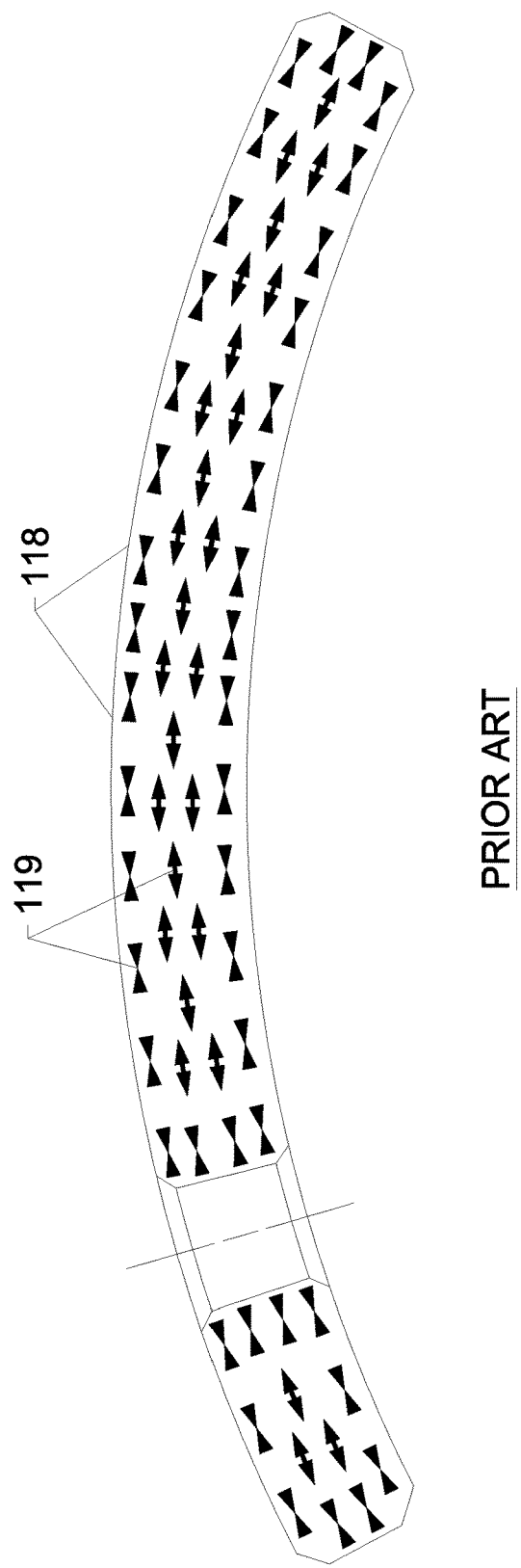
FIG. 11 is a cross sectional view of a bent, fully-tempered, glass sheet.
Figure 12:
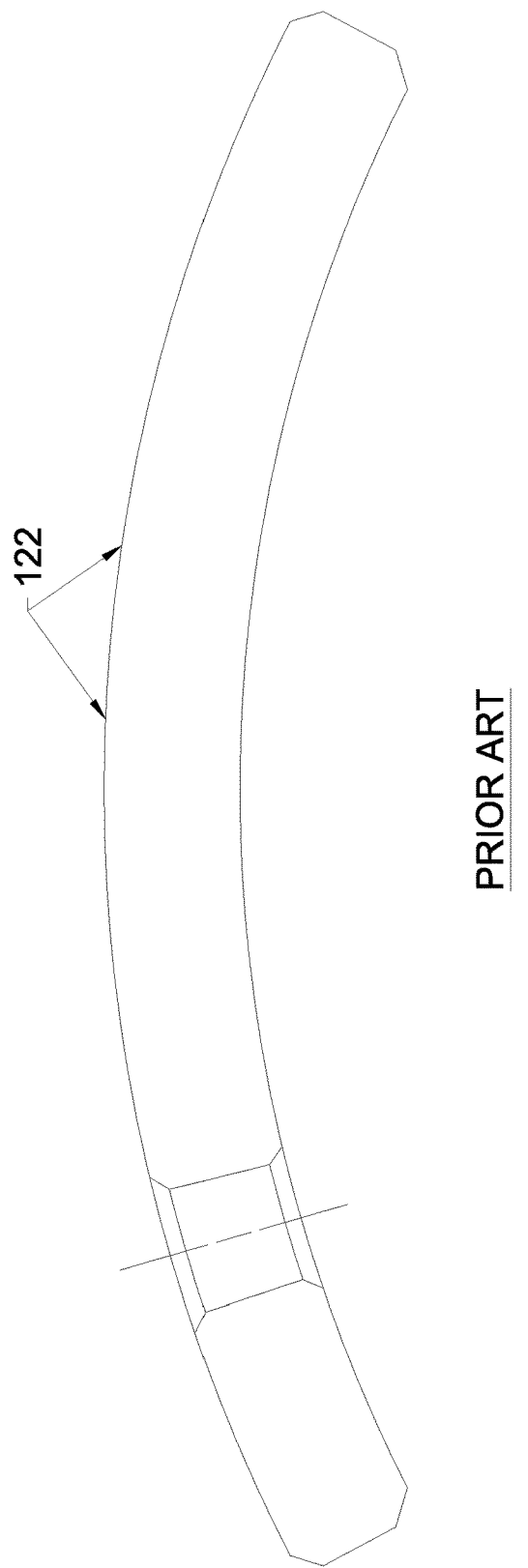
FIG. 12 is a cross sectional view of a bent, annealed glass sheet.
Figure 13:
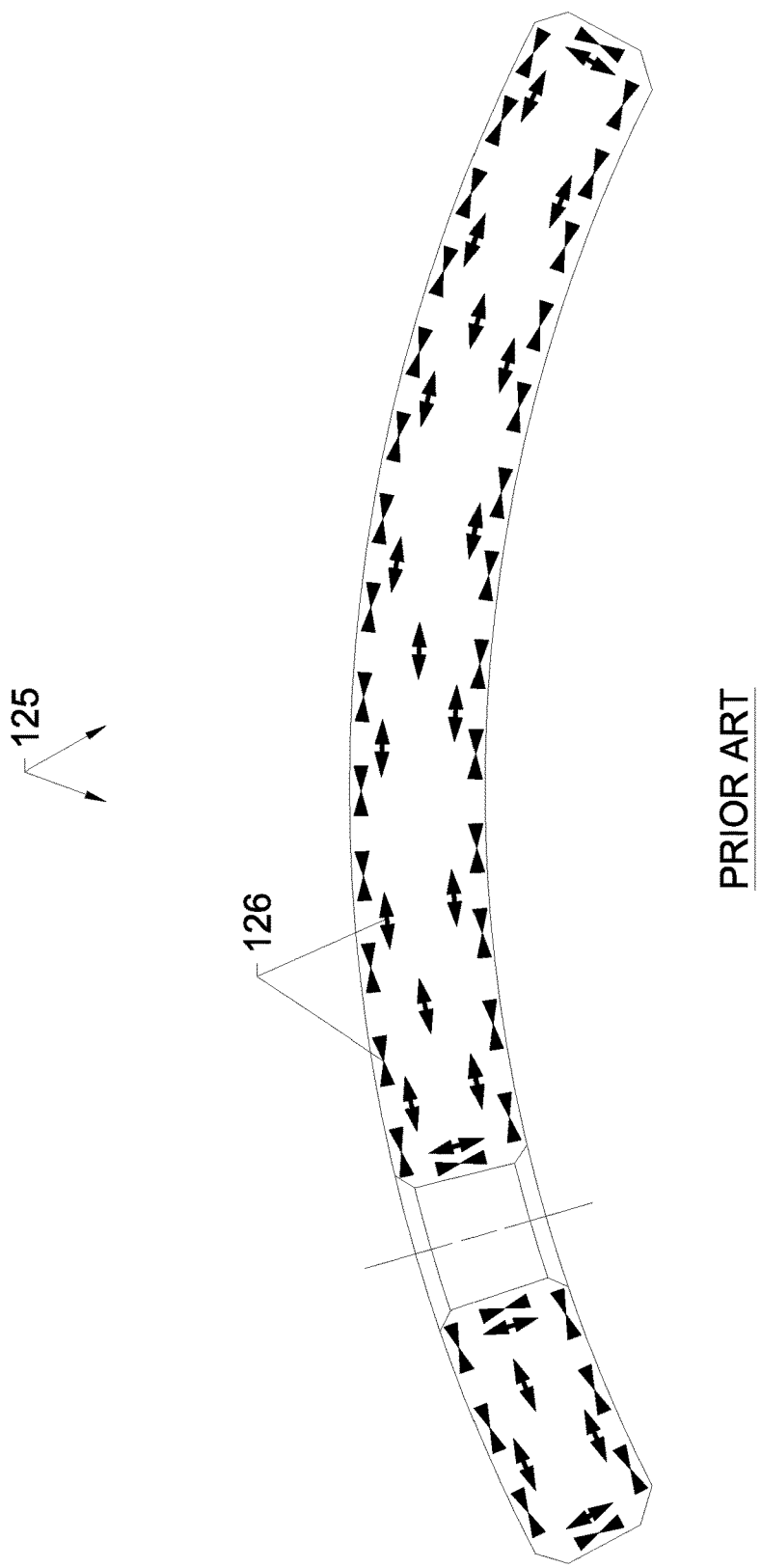
FIG. 13 is a cross sectional view of a bent, chemically-strengthened glass sheet.

The bent, fully-tempered glass sheet 118 (FIG. 11) is characterized by a surface compressive stress of at least 69 MPa. (i.e., megapascals, corresponding to 10,000 pounds per square inch) or an edge compressive stress of at least 67 MPa. Sheet 118 conforms as a safety glass when small particle size upon breakage is tested in accordance CPSC CFR 1201 and/or ANSI Z97.1. The opposed arrow symbols 119 (FIG. 11) diagrammatically indicate increased residual compressive and tensile stresses, and they should be compared to arrow symbols 111 associated with panel 110 (FIG. 10).

The bent, annealed glass sheet 122 (FIG. 12) is not heat-treated. It is characterized by a surface compressive stress of not more than 1.38 MPa. as defined by general commercial practice. Annealed glass sheets are not preferred for use with this invention. Annealed glass is unsuitable for use as the thick bent glass substrate with this invention because its unenhanced strength is unable to resist high thermal and mechanical forces without an excessive risk of breakage. Annealed glass sheets are unsuitable for use as the glass veneer sheets with this invention because the absence of surface compressive stresses, and thus strength enhancement, may be characterized as excessively fragile.

A bent, chemically-strengthened glass sheet 125 (FIG. 13) is not heat-treated. Chemically-strengthened glass as defined by ASTM C1422/C1422M is characterized by a surface compressive stress of at least 7 MPa., though the surface compressive stress is usually many times higher than this minimum, and a depth of compressive stress (case depth) measured in microns. Bent, chemically-strengthened glass pieces are not preferred for use as the thick substrate with this invention because the shallow compressive stresses are more vulnerable to breakage from perimeter and perforation edges. Additionally, the shallow depth of compressive stresses and the absence of high levels of central tension in the thicker pieces of glass contemplated for use as the bent glass substrate in this invention negate a requirement for encapsulation by a glass veneer sheet and polymer interlayer as a protective barrier to dampen the explosive release of deep residual stresses on breakage. However, chemically-strengthened glass is the preferred glass kind for use as thin glass veneer sheets applied to the bent glass substrate for the numerous reasons already outlined. The diagrammatic arrow symbols 126 (FIG. 13) should be compared to symbols 111 (FIG. 10) and 119 (FIG. 11) discussed above for an appreciation of location of residual stresses. Heat-strengthened and fully-tempered sheets 110 and 118 of FIGS. 10 and 11 respectively exhibit deeper compressive stresses especially at along the edges of the perimeter and those of perforations.

Figure 14:
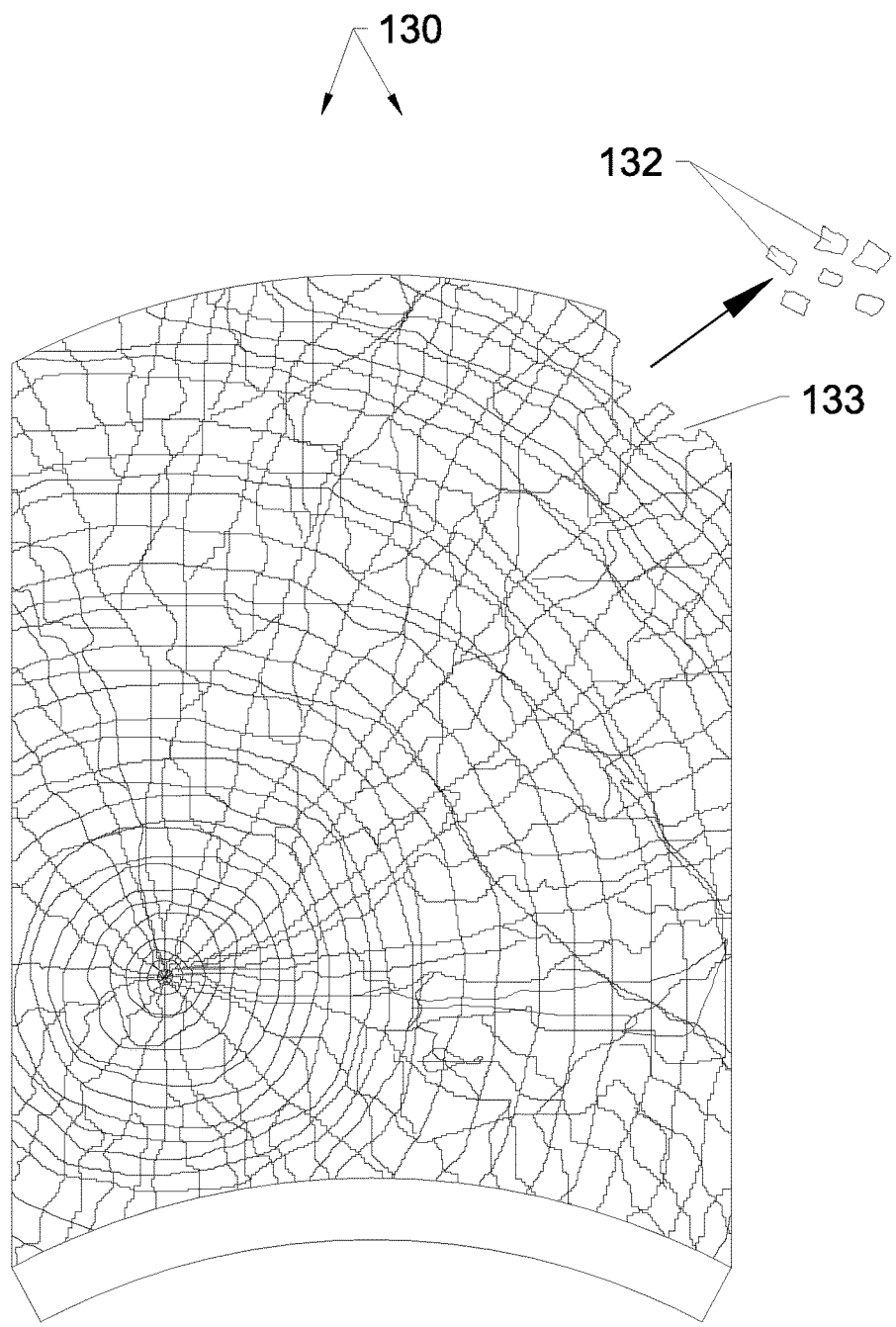
FIG. 14 is a frontal elevational view of a prior art, bent, fully-tempered glass panel that has experienced breakage and release of its internal residual stress.

FIG. 14 illustrates one of the two kinds of bent, glass panels that can currently qualify by testing for designation as a safety glazing material in architectural and interior applications. FIG. 14 shows a bent, fully-tempered glass panel 130. A bent, fully-tempered glass sheet is heat-treated during processing and then rapidly cooled to impart deep compressive stresses in all surfaces for robust enhanced strength. However if a panel 130 is broken, it releases its internal residual stress and disintegrates into small granular fragments 132. A bent, fully-tempered glass panel is less likely to injure because of its enhanced strength to resist breakage, and when broken by a specified impact, it disintegrates into these small fragments. However the subsequent disintegration 133 and small particles dislodging 132 in the event of breakage presents a safety hazard by nature of the total mass and quantity of particles dislodging, especially when installed directly overhead.

Figure 15:
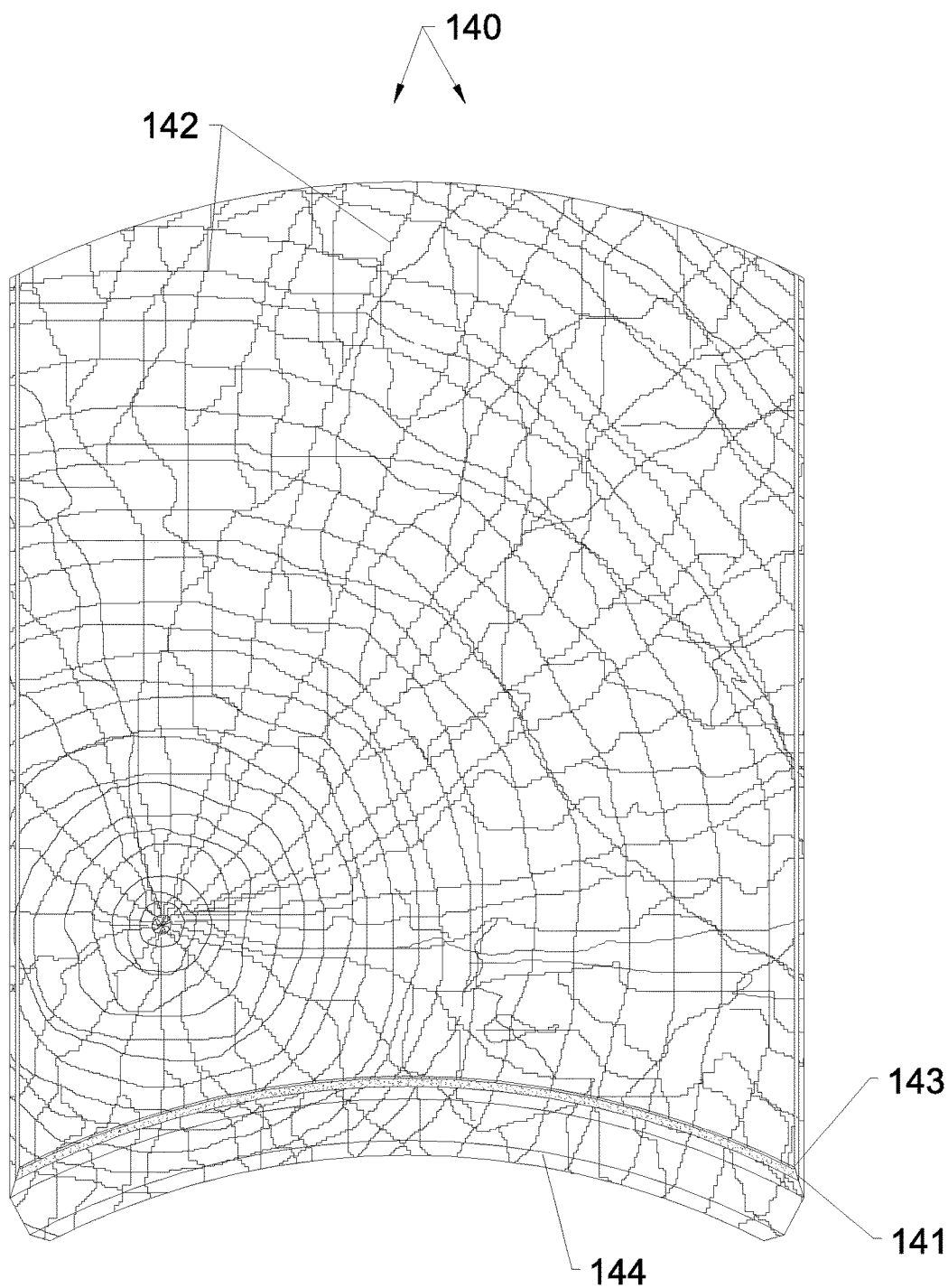
FIG. 15 is a frontal elevational view of a bent, laminated glass panel constructed in accordance with the invention that has experienced breakage and release of its internal residual stress.

FIG. 15 shows a bent, laminated, fully-tempered glass panel 140 according to the invention. A laminated safety panel is the second kind of bent glass panels that can currently qualify by testing for designation as a safety glazing material in architectural and interior applications since the glass mass remains substantially unitary without large tears, shears, or openings though some particles may dislodge. A laminated panel is less likely to injure because, when broken by a specified impact, the polymer interlayer 141 binds the glass substantially together although cracks 142 inevitably develop. However the safety of the laminated panel according to the invention is enhanced by the heat-treated bent glass substrate 144 being encapsulated by the thin, chemically-strengthened, glass veneer sheet 143 and polymer interlayer 141 which serve to create a protective barrier that dampens the explosive release of internal residual stresses in the event of bent glass substrate breakage. This protective barrier prevents not only disintegration of the fully-tempered bent glass substrate which may present a safety hazard but also prevents particles dislodging from the thick fully-tempered bent glass substrate, a characteristic especially critical for glass installations located directly overhead.

Figure 16:
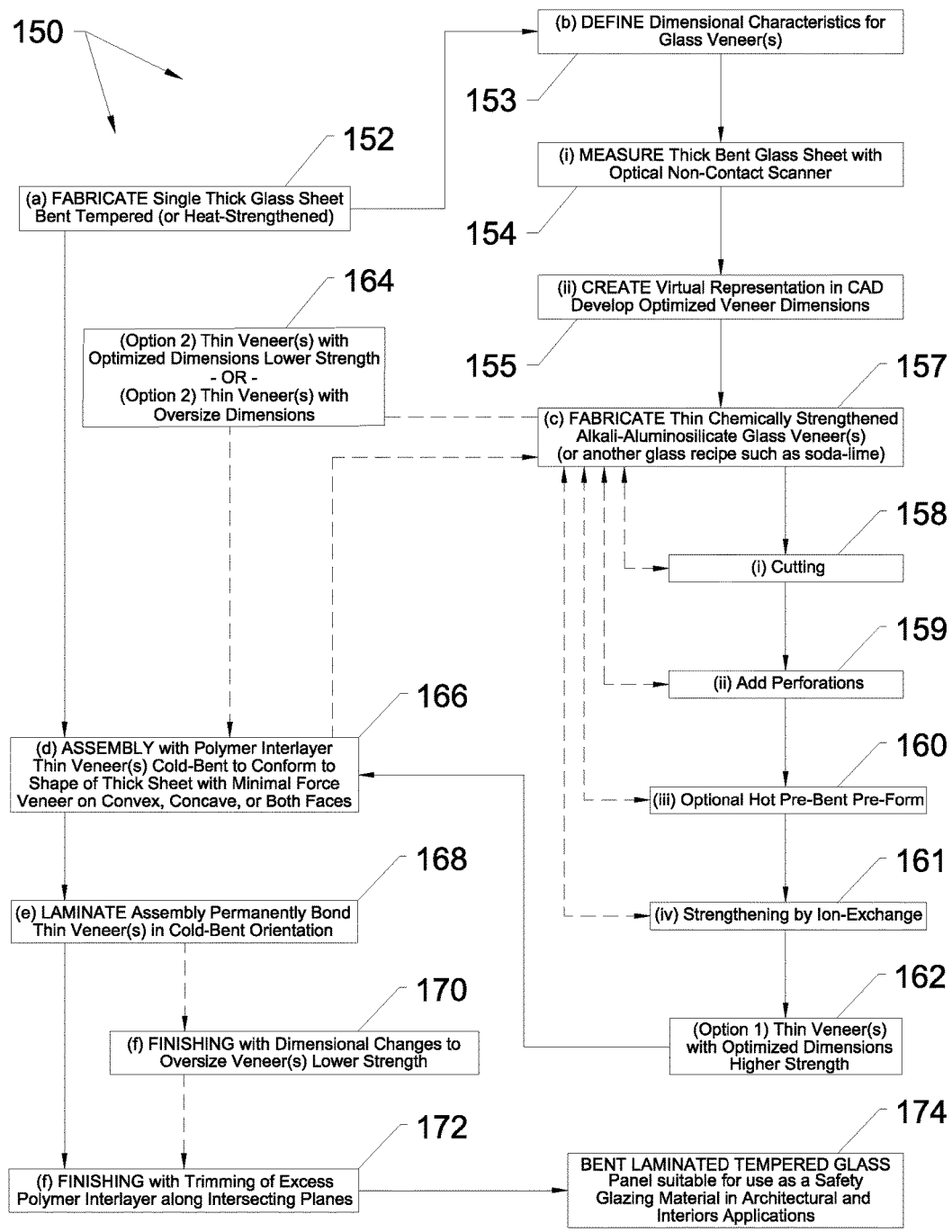
FIG. 16 is a flowchart illustrating the preferred method of manufacturing bent, laminated and fully-tempered glass panels in accordance with the invention.

FIG. 16 is a flowchart outlining the preferred process 150 for manufacturing bent, laminated, fully-tempered glass panels according to the invention. In the beginning step 152, a single, thick, bent, fully-tempered glass sheet to be used as a substrate is fabricated. (If less final strength is needed, then a bent, merely heat-strengthened glass sheet may be substituted.) In step 153 the dimensional characteristics for the desired glass veneer sheets are carefully determined before fabrication. While such dimensional characteristics may be defined mathematically with or without analog measurements of the existing bent, fully-tempered glass sheet from step 152, it is preferable to define such dimensions by digital means before fabrication of the glass veneer sheets. Thus step 153 comprises sub-step 154 of measuring the thick, bent fully-tempered glass sheet as it has been fabricated inclusive of dimensional tolerances. Preferably an optical non-contact scanner is employed for measuring. The scanner features high speed laser single point triangulation, laser line scanning, and white light scanning. These methods use either laser beams or white light that are projected against the surface of the part to generate many thousands of dimensional points representing dimensional properties. Alternately a CMM coordinate measuring machine may be utilized to locate dimensional points on the bent glass substrate. Then in sub-step 155 the "point cloud" representing the dimensional properties of the bent glass substrate is used to create a virtual representation of the glass panel in Computer-aided Design software. The surfaces may be developed, or flattened, to obtain optimized dimensions for the thin, chemically-strengthened glass veneer sheets.

After the CAD steps, the chemical-strengthened glass veneer sheet is fabricated in step 157 (FIG. 16) to the dimensional characteristics defined in step 153. The thin, chemically-strengthened glass veneer sheet is preferably fabricated from alkali-aluminosilicate glass, an alkali-containing glass particularly well-suited to rapid strengthening by ion-exchange to high levels of enhanced strength. However another alkali-containing glass recipe which can be chemically-strengthened may be substituted for use as the glass veneer sheet as previously described.

Fabrication of each thin, alkali-aluminosilicate, chemically-strengthened glass veneer sheet is conducted in various sequences from among the following steps where some steps may be performed more than once: cutting to size on perimeter edges in step 158; adding desired perforations such as holes or notches in step 159; and optionally hot bending in a furnace to thermally pre-form to a shape approximately matching that of the heat-treated bent glass substrate in step 160; and chemical-strengthening the glass veneer sheet by ion-exchange to impart residual compressive surface stresses in step 161. Furthermore, glass veneer sheets including those of an alkali-aluminosilicate recipe which are hot bent in step 160 by heating to temperatures of about 620 degrees C., and bending in a hot plastic state must after be chemically-strengthened by ion-exchange since the hot bending removes prior compressive stress. Additionally, notwithstanding which of the fabrication steps 158-161 are performed or omitted or repeated, the preferred option is immediately following strengthening by ion-exchange 161 to present one or more thin alkali-aluminosilicate chemically-strengthened glass veneer sheets for assembly in step 162 with high strength and optimized dimensional characteristics so perimeter edges are flush with or smaller than the perimeter edges of the thick, bent fully-tempered glass sheet and perforations such as holes or notches are flush with or larger than the perforations of the thicker bent glass substrate.

Optional step 164 (FIG. 16) is an alternative to the preferred step 162. In step 164, one or more chemically-strengthened glass veneer sheets are presented for assembly with optimized dimensions and lower strength, or alternately in an oversize condition. Firstly, one or more glass veneer sheets may be produced by cutting 158 and adding perforations such as holes or notches 159 to raw glass sheets already chemically-strengthened with no additional strengthening by ion-exchange 161 following. In such case, the glass veneer sheet is presented to the assembly with optimized dimensions but lower strength in step 164. An alternate method is to present one or more glass veneer sheets in an oversize condition 164 for careful preassembly and disassembly to the bent glass substrate followed by a return to the fabrication step 157 for additional cutting 158 and/or the addition of perforations 162. Such fabrication may be followed by strengthening by ion exchange 161 and conclude with glass veneer sheets with high strength and optimized dimensions in step 162. Alternately one or more chemically-strengthened glass veneer sheets may be presented for assembly in an oversize condition 164 and subject to later dimensional remediation after lamination. In all cases of cutting 158 or adding perforations 159 without a following step of strengthening by ion-exchange 161, the final strength of the glass veneer sheet is always at a level of strength less than otherwise achievable were no dimensional alterations undertaken after strengthening by ion-exchange 161. Any change to the dimensional properties of a glass veneer sheet must be completed without prohibited dimensional alterations to the already heat-treated thick bent glass substrate.

The assembly step 166 (FIG. 16) follows. In step 166, thin, alkali-aluminosilicate, chemically-strengthened glass veneer sheets may be assembled to the major convex and/or major concave surfaces of the thicker fully-tempered glass sheet. Initially all glass layers are cleaned and an adhesion promoter, such as silane, may be pre-applied to the glass surfaces which adjoin the interlayer. A sheet of polymer interlayer, preferably of PVB or ionoplast material, is cut slightly oversize by a CNC plotter from raw material rolls for disposition between the heat-treated bent glass substrate and the chemically-strengthened glass veneer sheet. The aforementioned polymer sheet is placed on top of the bent glass substrate followed by placement on top of the alkali-aluminosilicate, chemically-strengthened glass veneer sheet which is then cold-bent to conform with minimal force to the shape of the major surface of the fully-tempered bent glass substrate. Even if the glass veneer sheet during fabrication was hot bent and pre-formed to a shape approximating the bent glass substrate, the shapes do not match exactly and some cold-bending is still required for the glass veneer sheet to exactly conform to the major surface of the fully-tempered bent glass substrate. The separate step of cold-bending the alkali-aluminosilicate glass veneer sheets to match the bent glass substrate may also be modified by applying a little more force to slightly change the shape of the heat-treated bent glass substrate especially if it is of a thinner thickness and thus slightly flexible. For example the assembly may have clamps attached to slightly pull in the curve or the assembly may be clamped to a rigid form during assembly and permanent lamination. Again, it is required only the minimal force to conform to the shape of the thick fully-tempered bent glass substrate be used during cold-bending the glass veneer sheet as only a minimal amount of force is needed to unitize the assembly. Perimeter edges and perforations are checked for assembly alignment, reoriented as necessary, followed by temporary clamping in place.

In step 168 the assembly is laminated to permanently bond each thin alkali-aluminosilicate glass veneer sheet in its cold-bent orientation to the fully-tempered glass sheet by means of the polymer interlayer. Lamination follows with a polymer interlayer of PVB polyvinyl butyral, ionoplast, EVA ethyl vinyl acetate, TPU Thermoplastic polyurethane, polycarbonate, urethane, CIP cast-in-place curable resins, or other plastic materials and combinations thereof to permanently bond the glass veneer sheet in its cold-bent state with the heat-treated bent glass substrate. The basic method of lamination involves placing a plastic sheet between the glass layers then temporarily clamping in place. The assembly is then placed within a sacrificial polymer bag and an ancillary vacuum is applied to remove any trapped air between layers. The vacuum bagged assembly is inserted into an autoclave for the timed application of heat and pressure with localized vacuum to permanently fuse polymer interlayer and glass. However alternate methods of lamination are possible including, for example, pouring a polymer in liquid form between the glass layers and then curing solid by chemical or ultraviolet means. The preferred method for this invention is by autoclave with heat and pressure and local vacuum. Again the polymer interlayer remains substantially uniform in thickness during the lamination process because the thinness of the chemical-strengthened glass veneer sheet allows it to readily flex to match the shape (and its inconsistencies) of the heat-treated bent glass substrate thereby foregoing excessive flow in the thickness of the polymer interlayer and the optical exaggerations that result.

Optional step 170 includes finishing with dimensional changes to one or more glass veneer sheets fabricated in an oversize condition in step 164. Again it must be noted in all cases of cutting 158 and adding perforations 159, or abrasive grinding, without a following step of strengthening by ion-exchange 161, the final strength of the glass veneer sheet is always at a level of strength less than otherwise achievable were no dimensional alterations undertaken after strengthening by ion-exchange 161. Techniques such as laser cutting by ultra short pulse Picosecond or Femtosecond laser on perimeter edges or for adding perforations on already chemical-strengthened pieces are successful but result in an approximate 50% reduction in strength. Alternately, the depth of compressive stress may be reduced, for example to about 15 to 20 microns or less on sodium alkali-aluminosilicate, to allow for mechanical score/break cutting or abrasive grinding, though with an approximate 50% reduction of compressive strength within 20 mm. of dimensional alterations. Dimensional changes to the glass veneer sheet after lamination result in an approximately 50% reduction to the strength of the glass veneer sheet from the level otherwise achievable were no dimensional changes completed after strengthening by ion-exchange . As a result, changes to the dimensions of a glass veneer sheet after lamination is not the preferred method of manufacturing for this invention.

Step 172 involves trimming of the excess polymer interlayer using a sharp tool along planes which intersect the perforation and/or the perimeter edge finish of the thick bent fully-tempered glass sheet. Again the final removal of excess interlayer material leaves the polymer interlayer in a condition of minimal visibility at the ancillary side region of the thickness between the thin chemically-strengthened glass veneer sheet and the heat-treated bent glass substrate thereby forming an integrated unit exhibiting substantially smooth and uniform edges, providing an enhanced aesthetic appeal. The finished product is available in step 174. The glass veneer sheet and polymer interlayer form a protective barrier over the heat-treated glass that dampens the explosive release of its internal residual stresses when the bent glass substrate is broken preventing particles dislodging and subsequent disintegration. The high strength and larger breakage fracture pattern of the glass veneer sheet serve, in combination with the lamination interlayer, to create a barrier that prevents even small glass particles from departing the assembly in the event of explosive breakage and release of the stresses from within the heat-treated bent glass substrate. As a final step, testing proceeds of a representative sample of the final product for conformance to applicable laminated safety glass standards including ANSI Z97.1 and CPSC CFR 1201.

Figure 17:
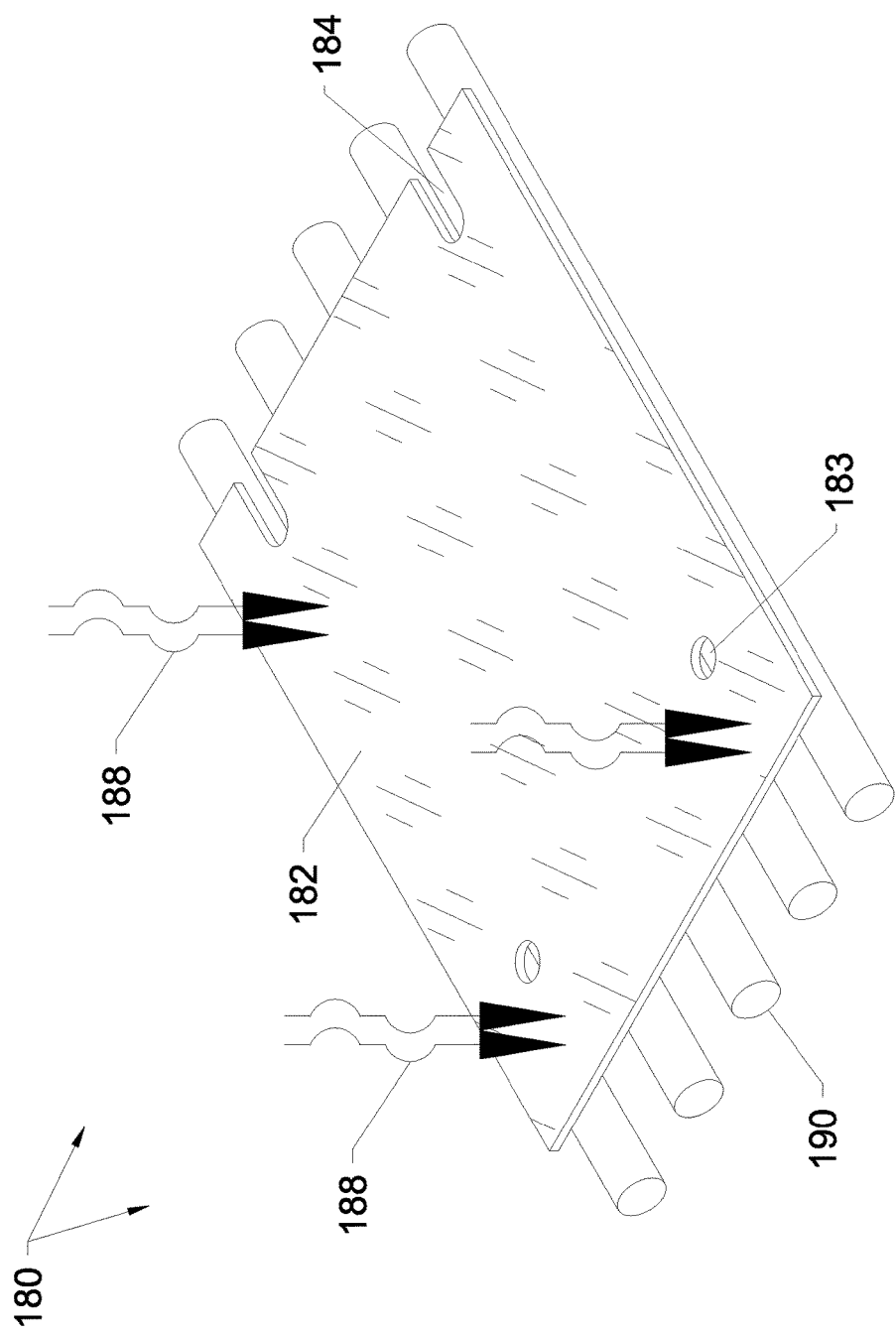
FIGS. 17 and 18 are sequential, diagrammatic illustrations of the preferred heating and cooling method, respectively, for the bent, fully-tempered, glass sheet of the invention.
Figure 18:
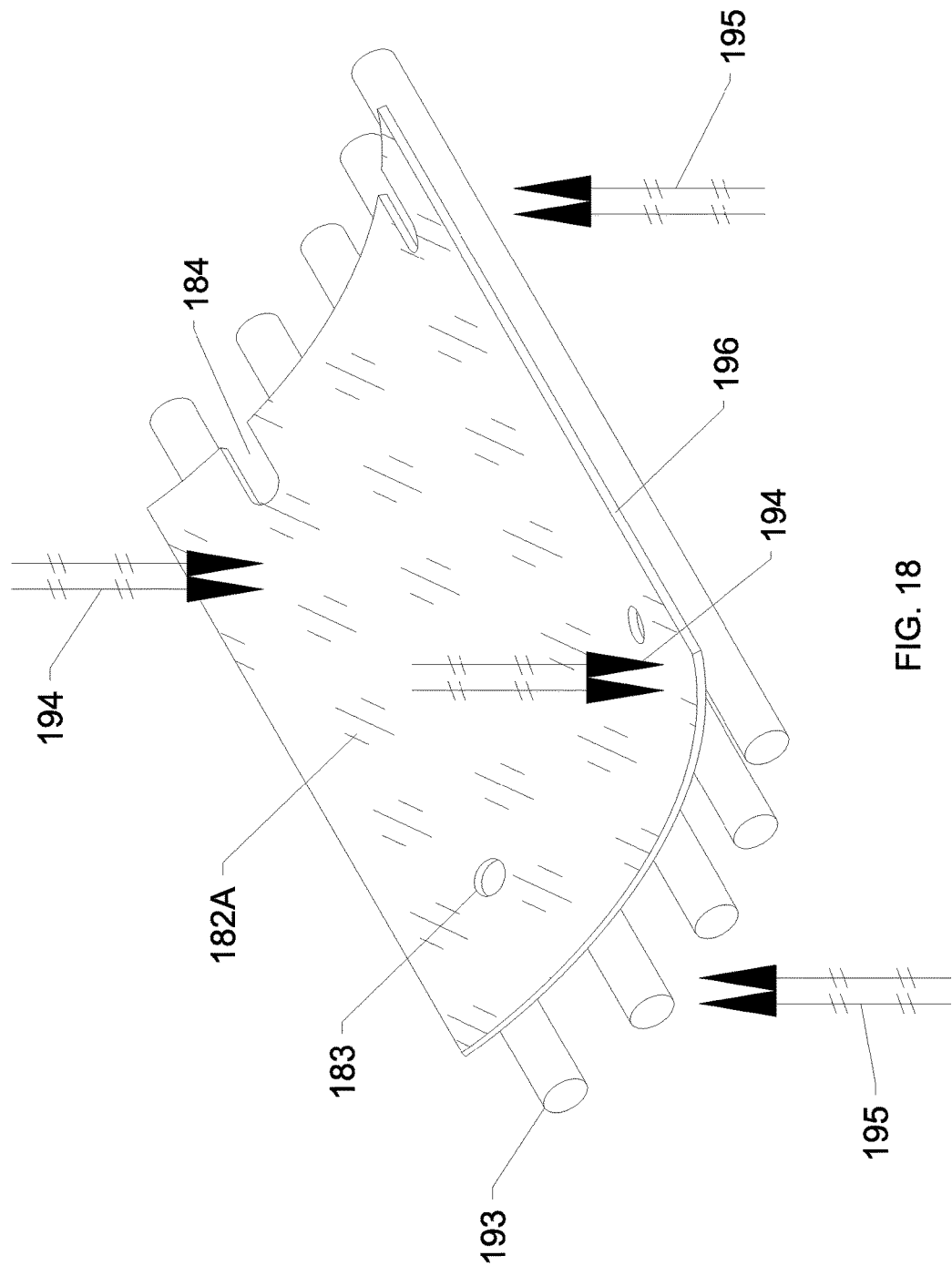

FIGS. 17 and 18 illustrate a method of manufacturing bent, fully-tempered glass panels. In FIG. 17 a hot furnace, generally designated by the reference numeral 180, substantially homogeneously applies heat to a single, thick glass sheet 182 that will be used as a bent glass substrate. The flat glass sheet 182 is first selected from commercially available raw sheets of clear, low-iron, tinted float glass with or without a coating. The raw sheet is cut, edged, then optionally drilled or milled or water-jet cut with perforations 183 and notches 184. It must be stated panels constructed in accordance with the invention are not required to contain perforations such as holes or notches. The sheet 182 is heated within furnace 180 beyond its deformation temperature (i.e. about 620 degrees C.). Heat application is represented diagrammatically by arrows 188. Sheet 182 is conveyed by rollers designated by the reference numeral 190 to an interfacing support where the heated sheet sags by gravity under force of its own weight, or with the assistance of mechanical forces from a press (not shown), until it is shaped. Rollers 193 are arrayed to support the curved substrate. In FIG. 18 the hot bent, glass sheet 182A is forcibly cooled by high-pressure air from upper blowers 194 and lower blowers 195 to solidify the new shape and capture the residual compressive and tensile stresses. Preferably the edges of perforations 183 and notches 184, and the perimeter edges 196 are highly polished and finished.

Figure 19:
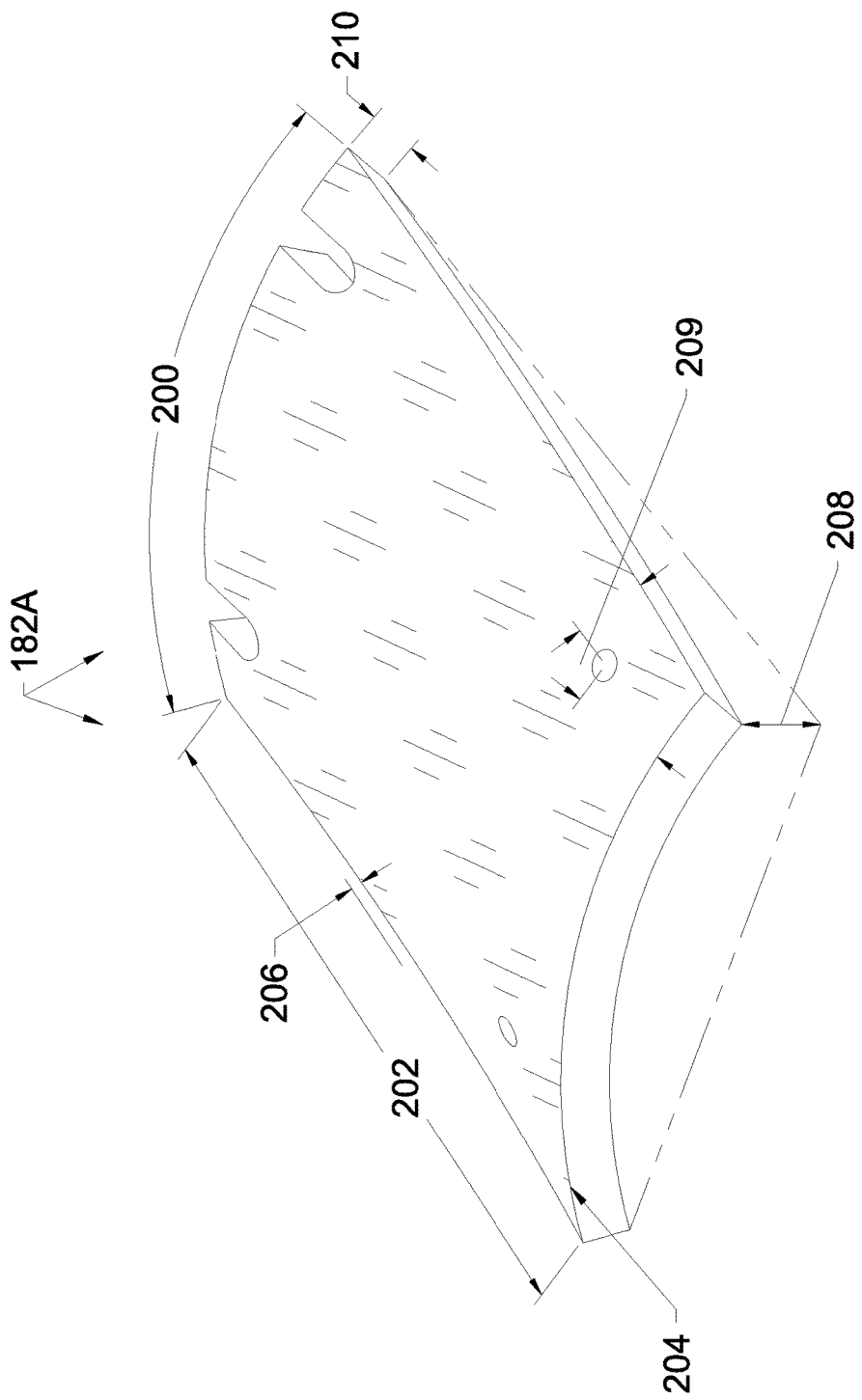
FIG. 19 is an enlarged, diagrammatic view illustrating dimensional variances experienced by thick, bent heat-treated and fully-tempered glass sheets.

FIG. 19 illustrates the dimensional variances experienced with a thick, bent fully-tempered or heat-strengthened glass sheet such as sheet 182A processed as in FIG. 18. Acceptable dimensional tolerances are codified in ASTM C1464 as generally +/−3.2 mm. or greater for the various dimensions. These include girth 200 (i.e., the distance around the curve), length or height 202 perpendicular to the curve, shape accuracy 204, crossbend 206 (deviation of the non-curved edge from true), twist 208 (corners out of plane). Thickness 210 tolerances are codified in ASTM C1036. The size, profile and location from the nearest edge of perforations including holes 209 also have variances of generally +/−1.6 mm. as codified in ASTM C1048. A bent glass fully-tempered glass sheet always exhibits some disparity of dimensions to those which are specified as optimal by the end user because of the residual stresses and the manufacturing methods. It is these dimensional variances which are preferably defined digitally so at least one thin chemically-strengthened glass veneer sheet may be fabricated with a high degree of accuracy for later assembly to a major surface of a thick, bent, fully-tempered glass sheet such as sheet 182A. Where localized warping resulting from roller wave distortion or differential heating results in unintentional shape variations in a flat heat-treated glass sheet, and where absolute conformance between assembled layers for outstanding optical quality is desirable, the lamination of one or more glass veneer sheets cold-bent to exactly match the variances from absolute flatness in a heat-treated "flat" glass substrate is contemplated.

Figure 20:
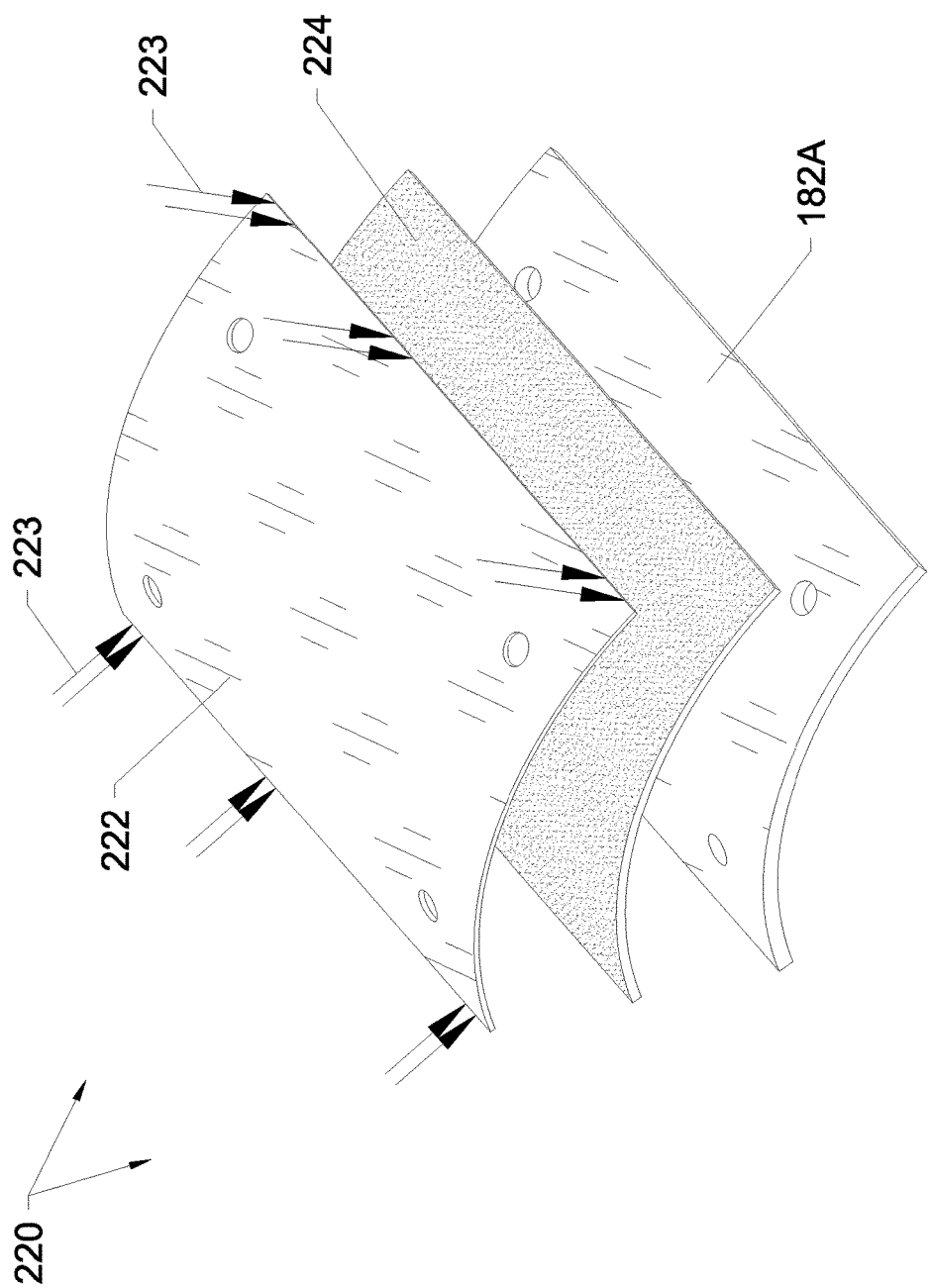
FIGS. 20 and 21 are isometric diagrammatic views illustrating a method of manufacturing a bent, laminated fully-tempered glass panel with at least one, thin, alkali-aluminosilicate chemically-strengthened glass veneer sheet.

FIG. 20 diagrammatically illustrates a method of manufacturing a bent, laminated fully-tempered glass panel 220. At least one thin, alkali-aluminosilicate, chemically-strengthened glass veneer sheet 222 is cold-bent (i.e., as indicated diagrammatically by arrows 223) into a convex profile to conform to the shape of the major convex surface of the fully-tempered bent glass sheet 182A on which it is assembled. Cold-bending is the application of mechanical force to flex a sheet and thereby change its shape but without the presence of heat outside that of about room temperature. A polymer interlayer 224 is placed between each glass veneer sheet 222 and the thick, bent fully-tempered glass sheet 182A. Polymer interlayers such as PVB and to a lesser extent ionoplast have rigid environmental criteria regarding temperature, moisture exposure and cleanliness prior to permanent lamination. Assembly of the panel including cold-bending is carried out in an ISO 6 level clean room complex with a carefully maintained temperature of between 18 to 22 degrees C. and with 23% to 33% relative humidity. The lower temperature helps avoid tackiness to the interlayer during assembly with the thin glass veneer sheet. The carefully controlled humidity prevents the moisture content of the polymer interlayer moving outside of specification prior to permanent lamination in the autoclave. The thin, alkali-aluminosilicate, chemically-strengthened glass veneer sheet 222 most likely already sagging under its own weight conforms with minimal force to the convex shape of the major convex surface of the bent glass sheet 182A to which it is assembled. The glass veneer sheets may be assembled to either the major convex and/or major concave surfaces of the bent fully-tempered glass sheet 182A.

Figure 21:
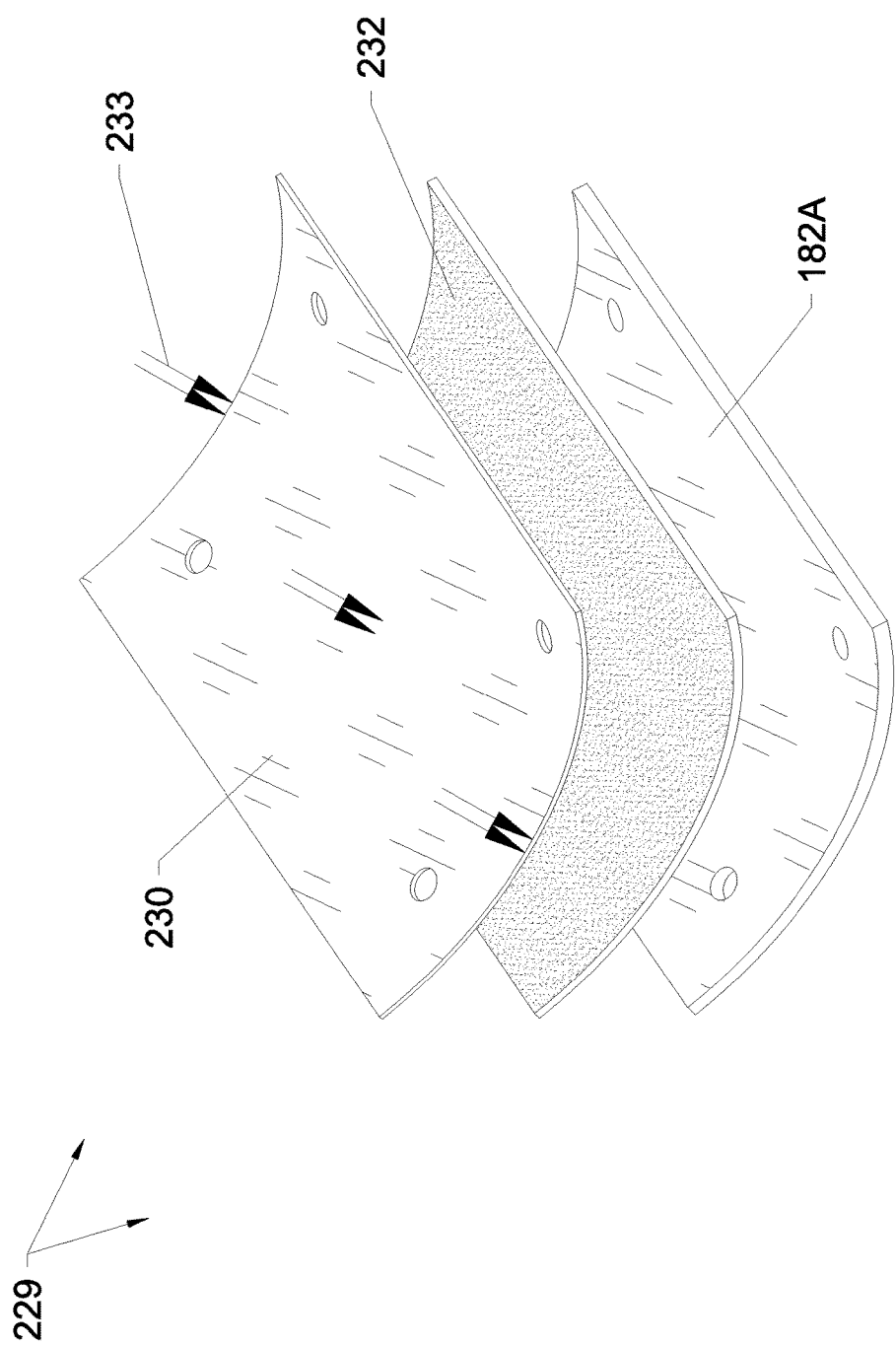

Noting FIG. 21, panel 229 is made from a glass veneer sheet 230 placed on the concave surface of glass panel 182A over a polymer interlayer 232. Arrows 233 (FIG. 21) diagrammatically indicates the application of pressure. At least one thin, alkali-aluminosilicate, chemically-strengthened glass veneer sheet 230 is cold-bent into a concave profile to conform to the shape of the major concave surface of the fully-tempered bent glass sheet 182A to which it is assembled. Cold-bending is typically undertaken by applying hand pressure to the thin glass veneer sheet in order to bend it into shape conformance with the thicker heat-treated bent glass substrate. Once such conformance is achieved in a localized region then temporary clamps are progressively added around the perimeter to hold the flexed cold-bent shape orientation in place. Mechanically flexed glass returns to its original shape when the mechanical force is released so the process is incomplete until the glass veneer sheet has been permanently bonded in its cold-bent orientation by means of permanent lamination to the bent glass substrate. The thin, alkali-aluminosilicate, chemically-strengthened glass veneer sheet 230 most likely already sagging under its own weight confirms with minimal force to the concave shape of the major concave surface of the bent glass sheet 182A to which it is assembled. The glass veneer sheets may be assembled to either the major convex and/or major concave surfaces of the bent fully-tempered glass sheet 182A.

Figure 22:
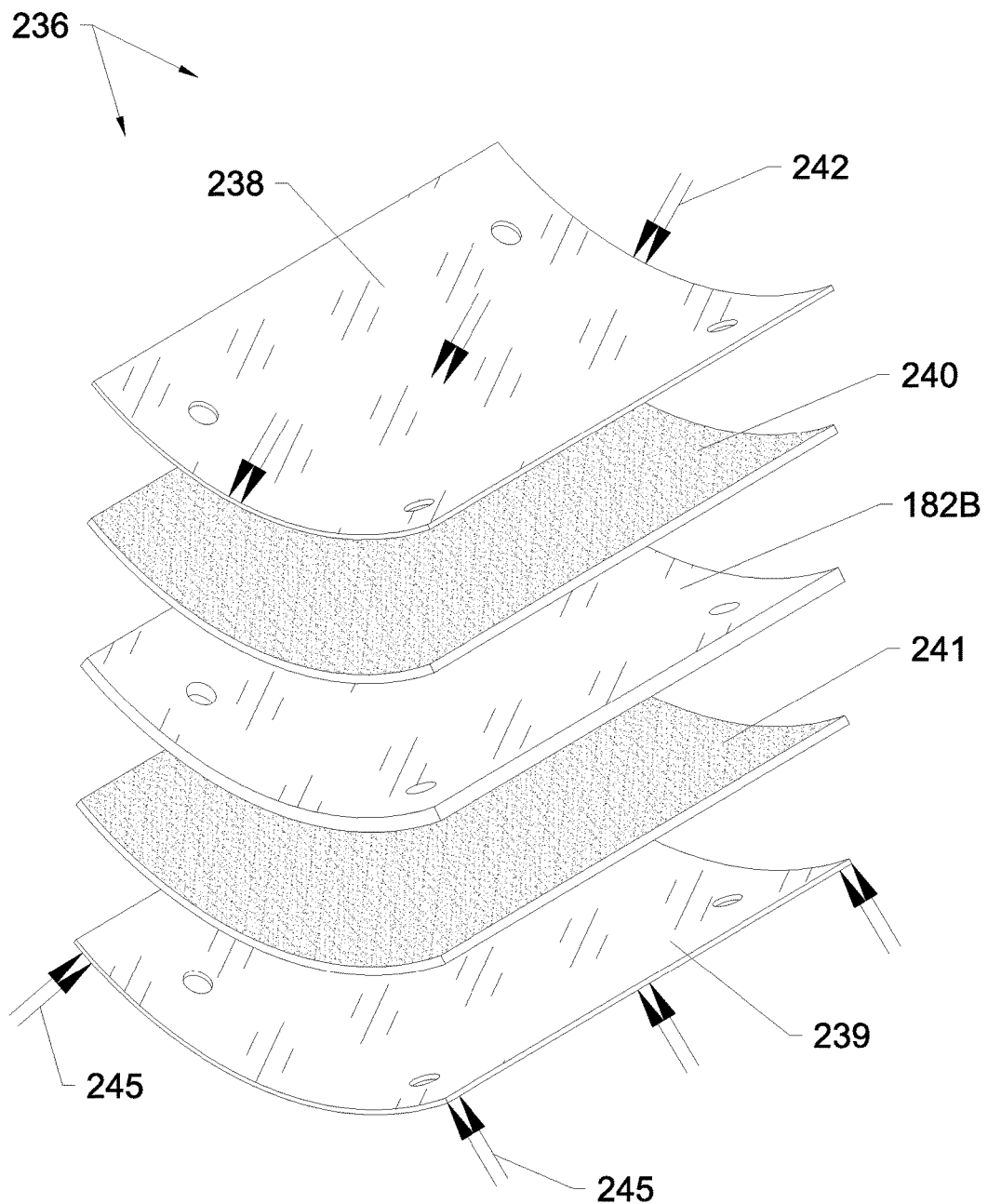
FIG. 22 is an exploded isometric view showing a bent, heat-treated glass panel with additional glass veneer sheets and polymer interlayers.
Figure 23:
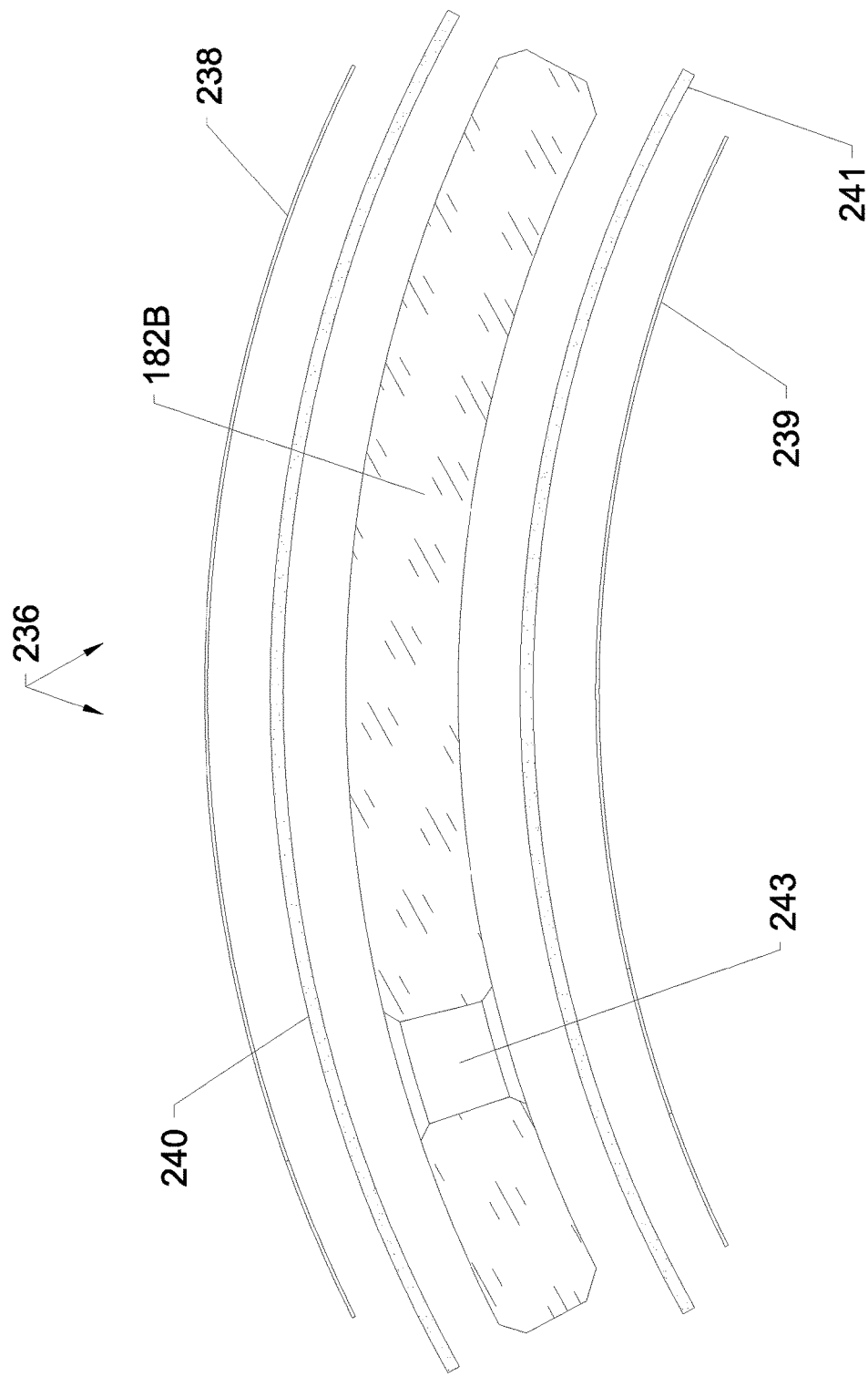
FIG. 23 is a fragmentary sectional view of the panel of FIG. 22.

From FIGS. 22 and 23 it will be appreciated that an alternative panel 236 may have glass veneer sheets 238 and 239 placed over both the concave and convex major surfaces of bent glass sheet 182B, with interlayers 240 and 241 respectively placed therebetween. Pressure is diagrammatically indicated by arrows 242 and 245 (FIG. 22). Noting FIG. 23 is an optional perforation 243 illustrated in the bent fully-tempered glass sheet 182B. The minimal forces necessary to cold-bend may be further quantified by the simple addition of a weight at the center of a flat, chemically-strengthened glass veneer sheet sample placed on top of a cylindrically concave surface in a self-supporting state along two parallel non-curved edges. A thin-chemically-strengthened glass veneer sheet of an alkali-aluminosilicate recipe and having a 0.85 mm. thickness with a size of 530 mm.× 530 mm. requires the addition of a weight with a mass of only 630 grams to result in its mechanical flexure in conformance to a heat-treated bent glass substrate with a moderately tight 1829 mm. radius. Alternately, a thin-chemically-strengthened glass veneer sheet of an alkali-aluminosilicate recipe and having a 0.85 mm. thickness with a size of 457 mm.×457 mm. requires the addition of a weight with a mass of only 3600 grams to result in its mechanical flexure in conformance to a heat-treated bent glass substrate with a tight 533 mm. radius. As such the forces involved are minimal and require only pressure applied by hand and no press or tool derived forces to impart shape symmetry to the glass layers.

Figure 24:
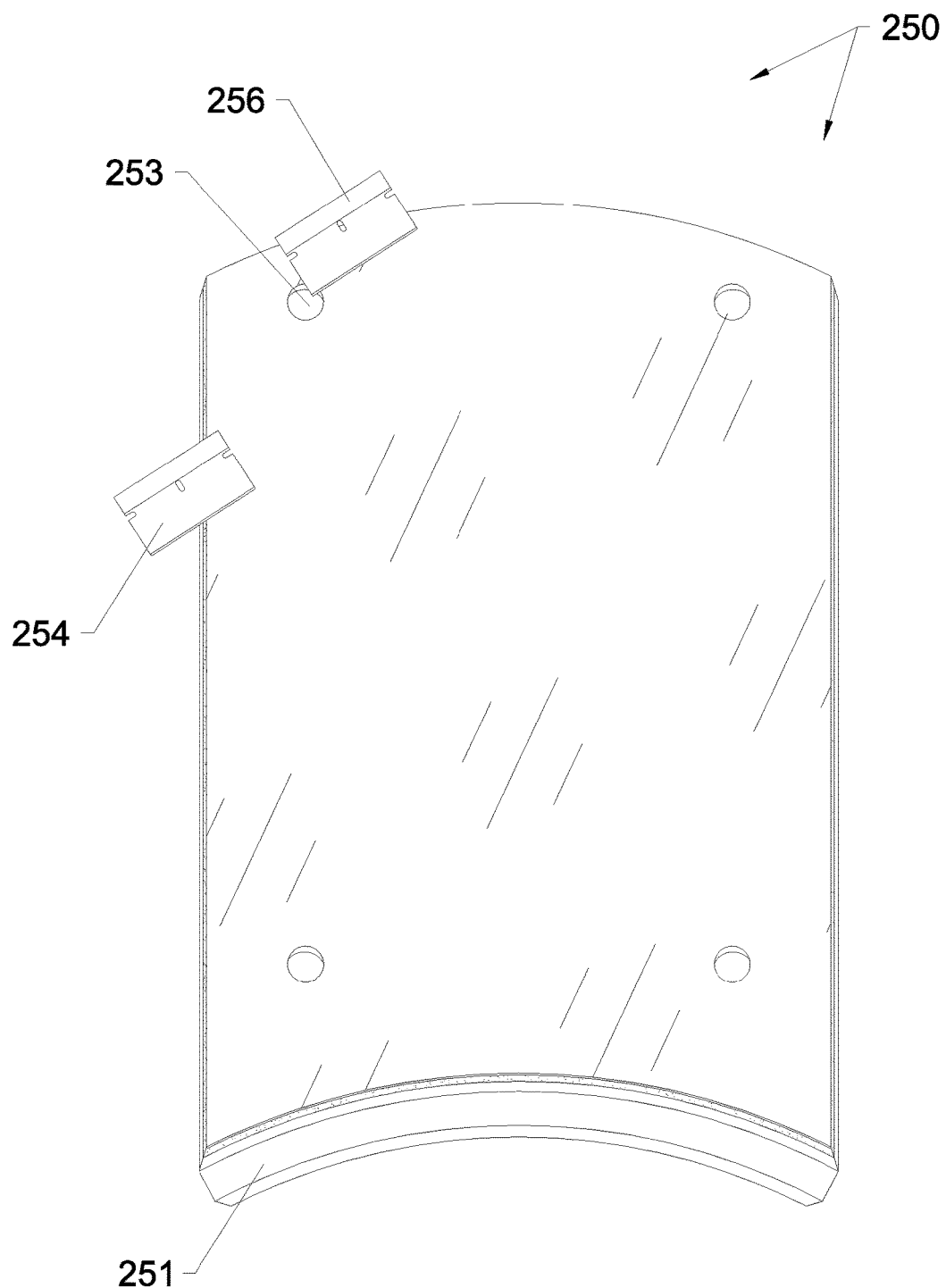
FIG. 24 is a diagrammatic view illustrating the trimming of a bent, laminated, fully-tempered glass panel.
Figure 25:
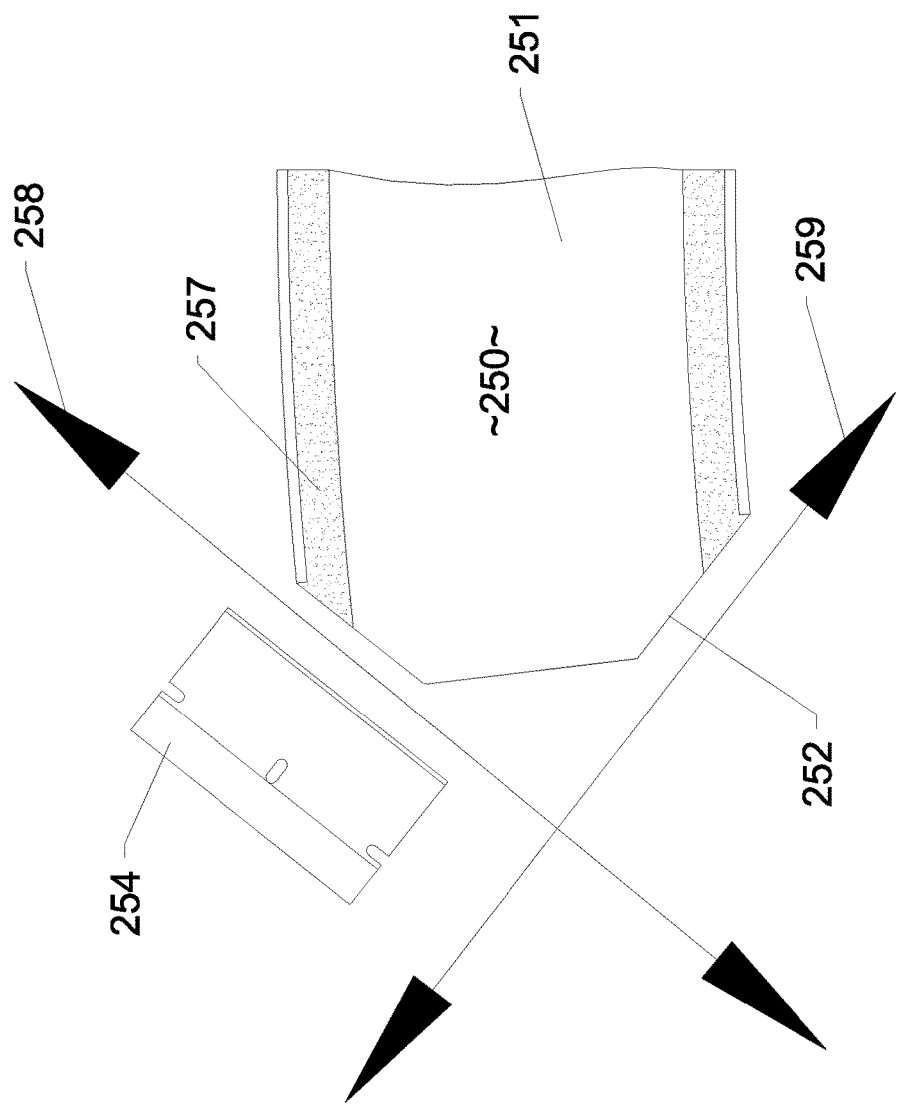
FIG. 25 is an enlarged, fragmentary diagrammatic view illustrating the preferred trimming plane of FIG. 24.
Figure 26:
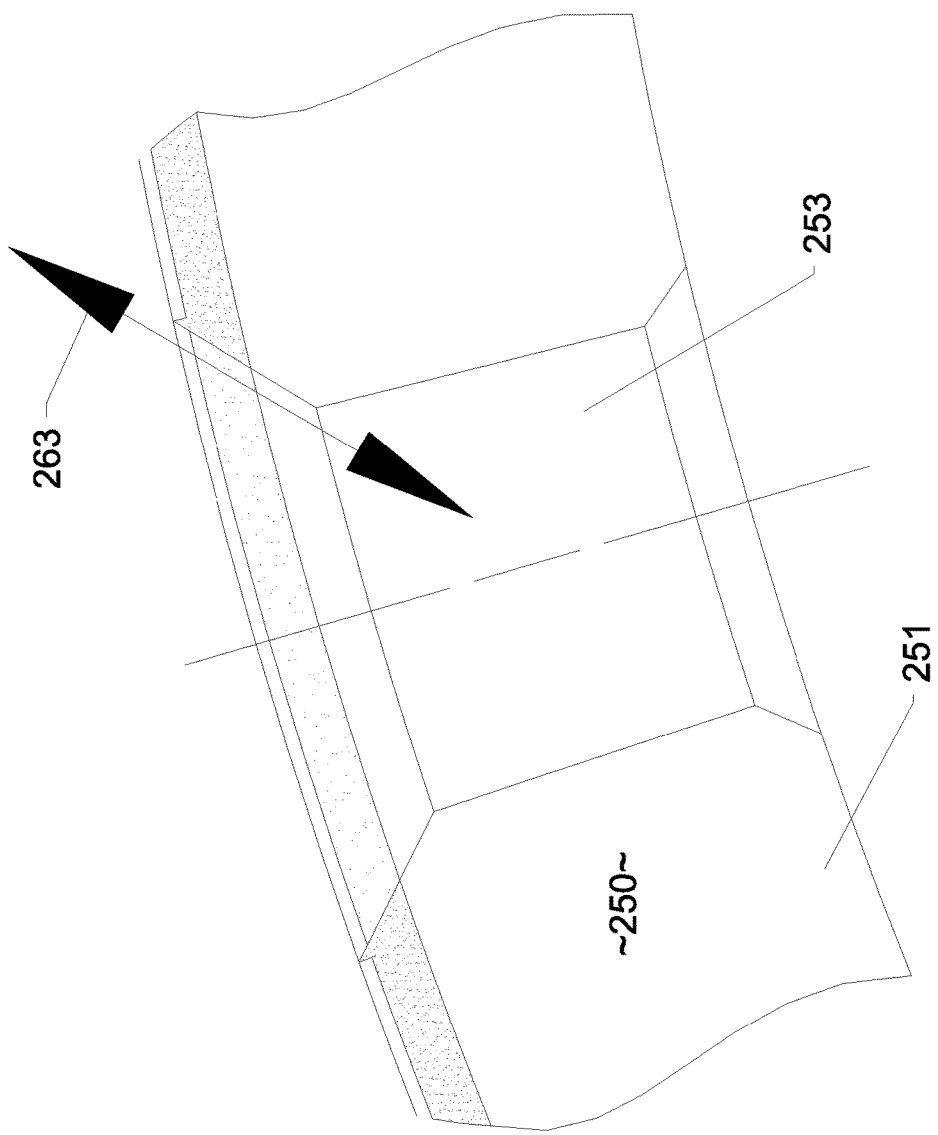
FIG. 26 is an enlarged, fragmentary diagrammatic view of a preferred perforation.

FIGS. 24-30 diagrammatically illustrate various steps in manufacturing the preferred bent, laminated, and fully-tempered glass panels of the invention. In FIGS. 24 and 25 a panel 250 with bent glass sheet 251 has perimeter edges 252 trimmed by a razor blade 254 and perforations such as holes 253 trimmed by a blade 256. Specifically, the excess polymer interlayer 257 (FIG. 25) is trimmed with a sharp tool such as razor blade 254 along planes (indicated generally by arrows 258, 259 in FIG. 25) which intersect the perimeter edge finish of the fully-tempered glass sheet 251, that also serves to guide the trimming plane. Blade 256 (FIG. 24) trims the perimeter of perforation 253 (FIG. 26) in the plane indicated generally by arrow 263. The resulting bent laminated fully-tempered glass panel has a perforation and/or perimeter edge finish without aesthetically displeasing overhangs between glass layers thereby imparting the appearance of a solid edge with a high quality finish where the polymer interlayer is unobtrusive. The bent laminated fully-tempered glass panel 250 is assembled so polymer interlayers adjoin the major surface of the component thick bent fully-tempered glass sheet at the periphery of the edge. The polymer interlayer in the invention is located in the least noticeable ancillary region of the edge finish remaining inconspicuous and less prone to dirt accumulation. Where localized warping resulting from roller wave distortion or differential heating produces unintentional shape variations in a flat heat-treated glass sheet, and where an edge finish resembling a monolithic glass piece with unobtrusive polymer interlayers for outstanding edge quality is desirable, the lamination of one or more glass veneer sheets cold-bent to exactly match the variances from absolute flatness in a heat-treated "flat" glass substrate is contemplated.

Figure 27:
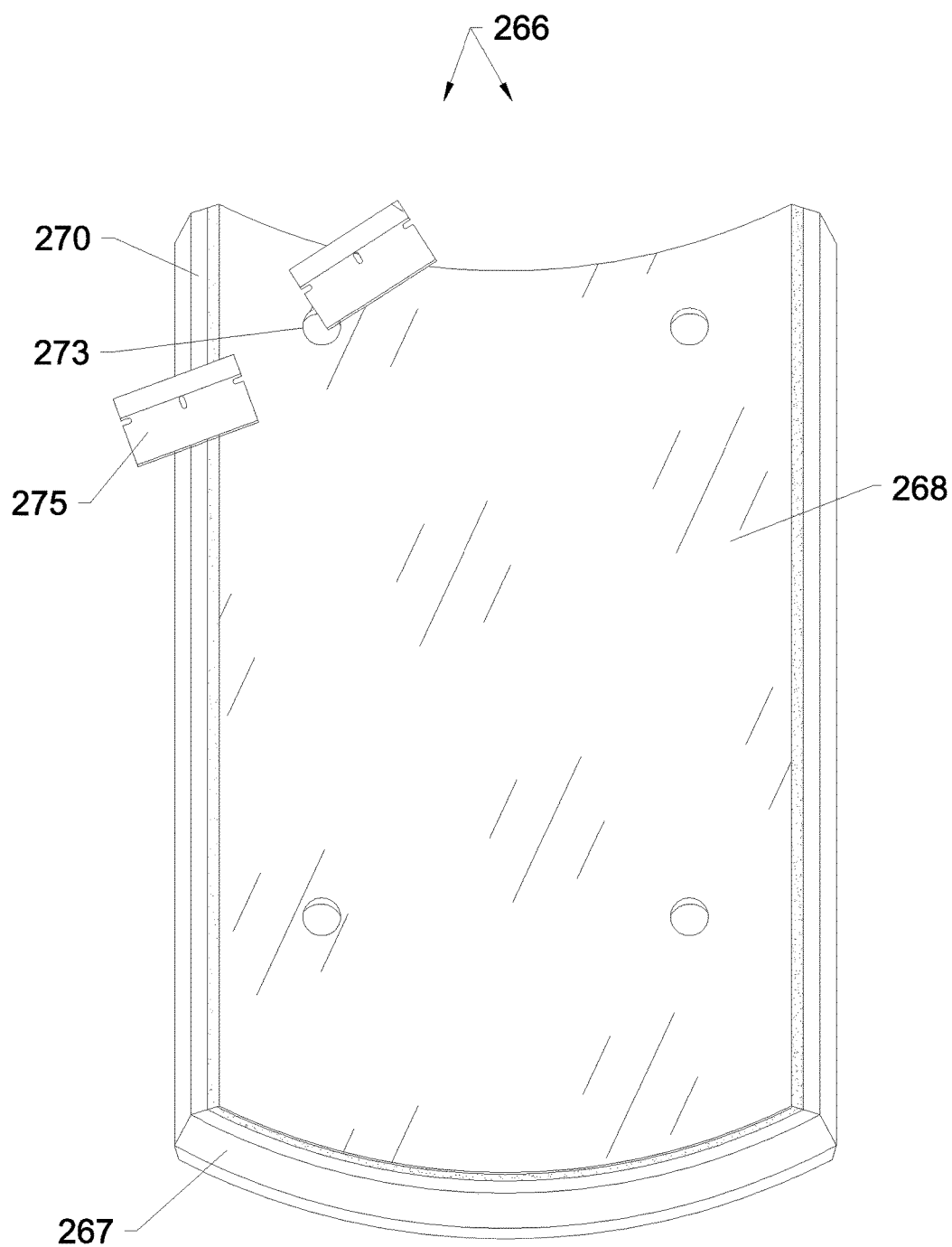
FIG. 27 is a diagrammatic view illustrating the trimming of a bent, laminated, fully-tempered glass panel.
Figure 28:
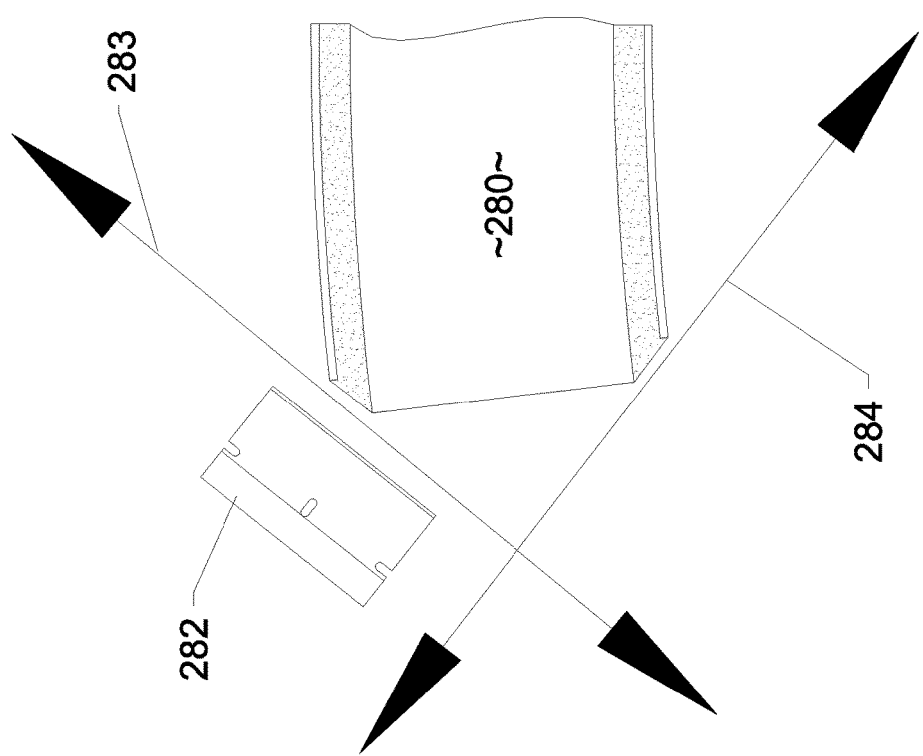
FIGS. 28 and 29 are enlarged, fragmentary diagrammatic views illustrating preferred trimming planes of FIG. 24; and, FIG. 30 is an enlarged, fragmentary diagrammatic view of a preferred perforation.
Figure 29:
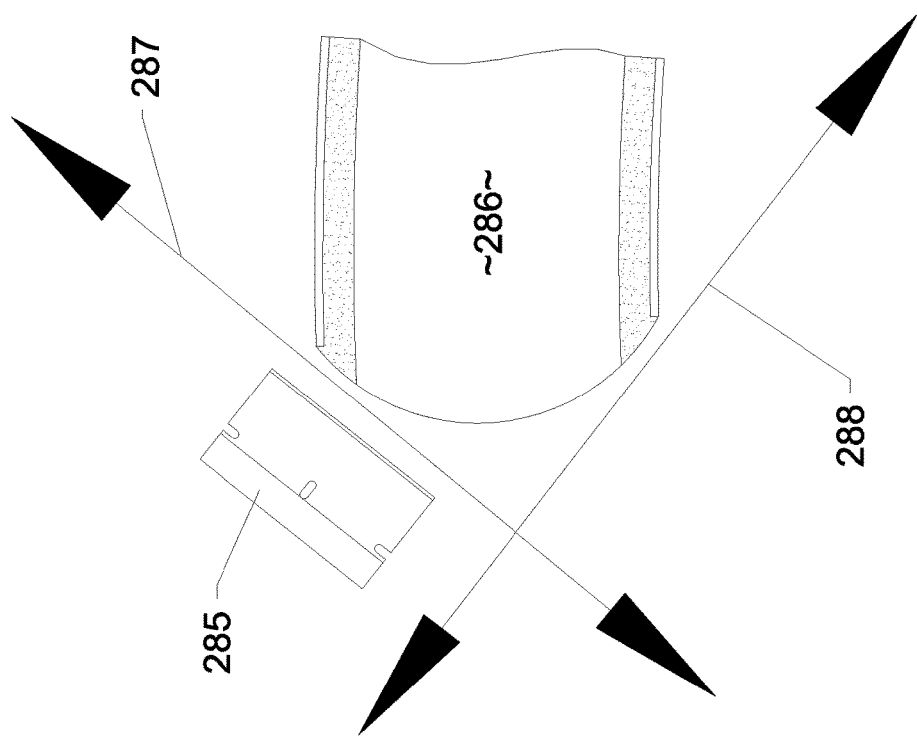
Figure 30:
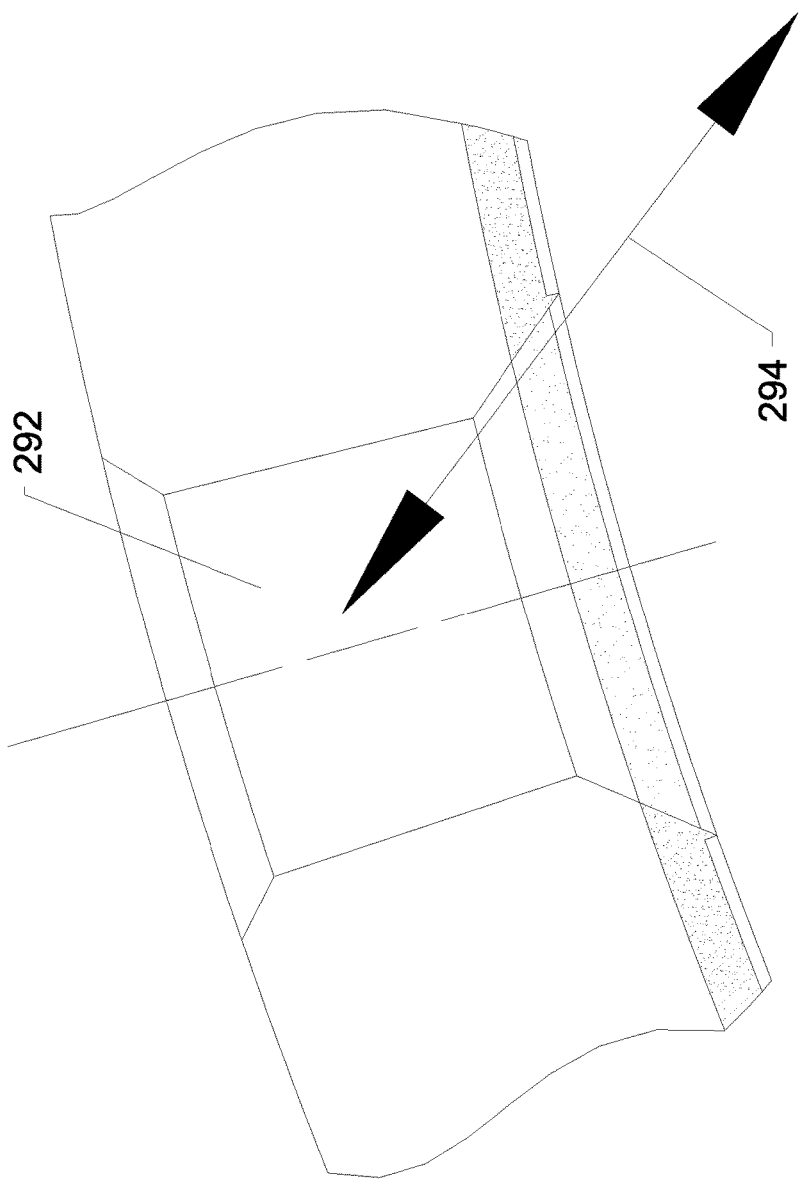

In FIG. 27 a panel 266 with bent glass substrate 267 has the glass veneer sheet 268 on its concave surface. Its perimeter edges 270 and perforations 273 are trimmed by a razor blade 275. FIG. 28 shows the trimming of a double-veneered panel 280 with a blade 282 that trims along planes indicated generally by arrows 283 and 284. Similar planing is accomplished in FIG. 29 on sheet 286 via blade 285 that trims along planes indicated by arrows 287, 288. Similar trimming (FIG. 30) about the perimeter of a perforation 292 is accomplished in the plane indicated generally by arrow 294. In the drawings, it will be appreciated that the dimensional characteristics of each thin, alkali-aluminosilicate chemically-strengthened glass veneer sheet are optimized so its perimeter edges are flush with or smaller than the perimeter edges of the thick, bent fully-tempered glass sheet and perforations such as holes or notches are flush with or larger than the perforations of the thicker bent glass substrate. The result is enhanced strength in the panel compared to laminated, bent glass of the same thickness manufactured from only non-heat-treated glass layers because of the deep compressive stresses at perimeter edges and perforations such as holes and notches. In addition, the shallower compressive stresses on the edges of chemical-strengthened glass veneer sheets are shielded from accidental impact or mechanical forces, especially if their compression is lessened by chipping or abrasions or scratches, by their location equal to or inset from the edges of the heat-treated bent glass substrate.

EXAMPLE ONE

A bent safety glass panel for use as semi-frameless glazing in an architectural high-rise railing application is manufactured in accordance with the invention. A clear raw flat glass sheet with a thickness of 12.4 mm. is cut-to-size, edge polished, drilled with two holes for later mounting of a handrail, heated to temperatures of about 620 degrees C., bent in its hot plastic state, and then heat-treated by forced cooling. The resulting fully-tempered bent glass substrate is characterized as having a surface compressive stress of at least 69 MPa. The convex surface of the thick bent glass substrate, which need be of accuracy no stricter than normal industry guidelines, is digitally measured as manufactured inclusive of dimensional tolerances by an optical non-contact scanner, specifically a Surphaser® three dimensional point scanning laser. The resulting "point-cloud data" representing the dimensional properties of the bent glass substrate is then transferred to CAD software. A working virtual three-dimensional model of the thick bent glass substrate is created to which representations are added of the glass veneer sheet and polymer interlayer. The dimensions for the thin glass veneer sheet are optimized within the model so as to flushly mate upon assembly with the major surface of the bent glass substrate, with perimeter edges smaller, and holes larger, than the thick sheet. The model of the glass veneer sheet is then developed, or unrolled into a flattened state, to create a dimensioned representation of the required sizing for fabrication.

A thin sodium alkali-aluminosilicate flat raw glass sheet with a thickness of 0.85 mm. is cut-to-size and perforated with two holes by a Picosecond laser to a dimensional accuracy of +/−200 microns and with resulting edges that are pristine and void of any chipping. An optimal composition for this glass veneer sheet is 60-65 mol % $SiO_2$, 10-15 mol % $Na_2O$, 10-15 mol % $Al_2O_3$, 6-9 mol % MgO, 4-8 mol % $K_2O$, and 0.5-2.0 mol % $ZrO_2$. Another suitable recipe is 66.7 mol % $SiO_2$, 13.8 mol % $Na_2O$, 10.5 mol % $Al_2O_3$, 5.5 mol % MgO, 2.06 mol % $K_2O$, 0.64 mol % $B_2O_3$, 0.46 mol % CaO, 0.34 mol % $As_2O_3$, 0.01 mol % $ZrO_2$, and 0.007 mol % $Fe_2O_3$. A third suitable recipe is 66.9 mol $SiO_2$, 10.1 mol % $Al_2O_3$, 8.39 mol % $K_2O$, 7.45 mol % $Na_2O$, 5.78 mol % MgO, 0.58 mol % $B_2O_3$, 0.58 mol % CaO, 0.2 mol % $SnO_2$, 0.01 mol % $ZrO_2$, and 0.01 mol % $Fe_2O_3$. The thin, sodium alkali-aluminosilicate glass veneer sheet is chemically-strengthened by placement in a tank of molten, about 400 degrees C., technical grade potassium nitrate KNO3 for about 5 hours until a high surface compressive stress of preferably at least 600 MPa., as well as a high depth of compressive stress of preferably at least 40 microns, is attained.

An oversize, PVB polymer interlayer sheet of DuPont Butacite® with a thickness of 1.52 mm. is placed over the convex surface of the thick bent glass substrate, with the thin glass veneer sheet placed there on top and cold-bent to identically conform with minimal force to the shape of the thick bent glass substrate. Temporarily clamped, the assembly is inserted into a sacrificial vacuum bag and vacuum force is applied to remove trapped air between the layers. The vacuum bagged assembly is then inserted into an autoclave and subjected to ninety minutes of heat at 135 degrees C. at a pressure of 1207 KPa. with localized vacuum at 737 mm. Hg. so as to permanently bond the thin, glass veneer sheet in its assembled shape on the thick, bent glass substrate. Following rapid cooling, excess polymer interlayer is trimmed along the perimeter edges and the (2) holes in planes parallel to the edge of thick bent glass substrate for an edge finish of high quality without misalignment and with minimal interlayer visibility.

The resulting bent glass panel is suitable to qualify by testing under CPSC CFR 1201 and ANSI Z97.1 as a safety glazing material for architectural and interior uses. The safety properties of the glass panel are enhanced by the convex glass veneer sheet and polymer interlayer which safely encapsulates the residual internal stress within the thick fully-tempered bent glass substrate suitable to prevent disintegration and particles dislodging in the event of its breakage, a desirable property to minimize any safety risk to balcony occupants and pedestrians beneath.

EXAMPLE TWO

A bent safety glass panel for use as frameless glazing in an interior shower enclosure application is manufactured in accordance with the invention. An ultra clear low-iron raw flat glass sheet with a thickness of 9.3 mm. is cut-to-size, edge polished, drilled and notched for handle and hinge hardware respectively, heated to temperatures of about 620 degrees C., bent in its hot plastic state, and then heat-treated by forced cooling. The resulting fully-tempered bent glass substrate is characterized as having a surface compressive stress of at least 69 MPa. The concave surface of the thick bent glass substrate, which need be of accuracy no stricter than normal industry guidelines, is digitally measured as manufactured inclusive of dimensional tolerances using the probe of a CMM coordinate measuring machine. The resulting point measurements representing the dimensional properties of the bent glass substrate are then transferred to CAD software. A working virtual representation of the thick bent glass substrate is created to which representations are added of the glass veneer sheet and polymer interlayer. The dimensions for the thin glass veneer sheet are optimized so as to flushly mate upon assembly with the major surface of the bent glass substrate, with perimeter edges smaller, and holes and notches larger, than the thick sheet. The representation of the glass veneer sheet is then developed, or transferred into a flattened state, to create a dimensioned representation of the required sizing for fabrication.

A thin lithium alkali-aluminosilicate raw glass sheet with a thickness of 1.1 mm. is cut-to-size and perforated with holes and notches by a Femtosecond laser to a dimensional accuracy of +/−100 microns and with resulting edges that are pristine and void of any chipping. An optimal composition for this glass veneer sheet is 61 mol % $SiO_2$, 18 mol % $Al_2O_3$, 10 mol % $Na_2O$, 5% mol $Li_2O$, 3 mol % $ZrO_2$, 1 mol % $K_2O$, 1 mol % CaO, and 1 mol % $B_2O_3$. Another suitable recipe is 67.2 mol % $SiO_2$, 20.1 mol % $Al_2O_3$, 3.2% mol $Li_2O$, 2.7 mol % $TiO_2$, 1.7 mol % ZnO, 1.7 mol % $ZrO_2$, 1.1 mol % MgO, 0.9 mol % BaO, 0.4 mol % $Na_2O$, 0.23 mol % $K_2O$, and 0.05 mol % CaO. The thin, lithium alkali-aluminosilicate glass veneer sheet is chemically-strengthened by placement in a tank of molten, about 400 degrees C., technical grade potassium nitrate KNO3 for about 5 hours until a high surface compressive stress of preferably at least 700 MPa., as well as a high depth of compressive stress of preferably at least 50 microns, is attained.

An oversize, ionoplast polymer interlayer sheet of DuPont SentryGlas® with a thickness of 0.89 mm. is placed into the concave surface of the thick bent glass substrate, with the thin glass veneer sheet placed on top and cold-bent to identically conform with minimal force to the shape of the thick bent glass substrate. Temporarily clamped, the assembly is inserted into a sacrificial vacuum bag and vacuum force is applied to remove trapped air between the layers. The vacuum bagged assembly is then inserted into an autoclave and subjected to ninety minutes of heat at 135 degrees C. at a pressure of 1207 KPa. with localized vacuum at 737 mm. Hg. so as to permanently bond the thin, glass veneer sheet in its assembled shape on the thick, bent glass substrate. Following controlled cooling, excess polymer interlayer is trimmed along the perimeter edges and the holes and the notches in planes parallel to the edge of thick bent glass substrate for an edge finish of high quality without misalignment and with minimal interlayer visibility.

The resulting bent glass panel is suitable to qualify by testing under CPSC CFR 1201 and ANSI Z97.1 as a safety glazing material for architectural and interior uses. The safety properties of the glass panel are enhanced by the concave glass veneer sheet and polymer interlayer which safely encapsulates the residual internal stress within the thick fully-tempered bent glass substrate suitable to prevent disintegration and particles dislodging in the event of its breakage, a desirable property to minimize any safety risk to the bathroom occupant.

EXAMPLE THREE

A bent safety glass panel for use as fully-framed glazing in an architectural curtain wall application is manufactured in accordance with the invention. A reflective low-emissivity coated and bronze tinted raw flat glass sheet with a thickness of 5.7 mm. is cut-to-size, edge polished, silkscreen painted with ceramic-frit paint, heated to temperatures of about 620 degrees C., bent in its hot plastic state, and then heat-treated by forced cooling. In this particular example there are no perforations such as holes or notches in the glass. The resulting heat-strengthened bent glass substrate is characterized as having a surface compressive stress of between 24 MPa. and 52 MPa. The convex and concave surfaces of the thick bent glass substrate, which need be of accuracy no stricter than normal industry guidelines, are analogue measured as manufactured inclusive of dimensional tolerances by means of a ruler. The dimensions for two thin glass veneer sheets, with perimeter edges oversize to the thick bent glass substrate, are mathematically calculated to obtain the required sizing for fabrication.

Two thin soda-lime silicate flat raw glass sheets with a thickness of 1.0 mm. are cut-to-size by scribing one surface with a carbide cutting wheel at the appropriate dimensions then snapping along the score lines. An optimal composition for these glass veneer sheets is soda-lime silicate glass with 70 mol % $SiO_2$, 13 mol % $Na_2O$, 10 mol % CaO, 4 mol % MgO, 2 mol % $Al_2O_3$, and 1 mol % $K_2O$. In this example, the flat, soda-lime silicate glass veneer sheets are optionally hot bent in a furnace to thermally pre-form to a shape approximately matching that of the heat-treated bent glass substrate. The thin soda-lime silicate veneer sheets are heated to temperatures of about 620 degrees C. and bent in a hot plastic state to a shape more closely matching the heat-strengthened bent glass substrate. The now bent, soda-lime silicate glass veneer sheets are chemically-strengthened by placement in a tank of molten, about 400 degrees C., technical grade potassium nitrate $KNO_3$ for about 16 hours until a moderate surface compressive stress of preferably at least 172 MPa., as well as a moderate depth of compressive stress of preferably at least 15 microns, is attained.

A first oversize PVB polymer interlayer sheet of DuPont Butacite® with a thickness of 2.28 mm. is placed over the convex surface of the thick bent glass substrate with a first thin glass veneer sheet placed there on top and cold-bent to identically conform with minimal force to the shape of the thick bent glass substrate. A second oversize PVB polymer interlayer sheet of DuPont Butacite® with a thickness of 2.28 mm. is placed into the concave surface of the thick bent glass substrate with a second thin glass veneer sheet placed there on top and cold-bent to identically conform with minimal force to the shape of the thick glass sheet. Temporarily clamped, the assembly is inserted into a sacrificial vacuum bag and vacuum force is applied to remove trapped air between the layers. The vacuum bagged assembly is then inserted into an autoclave and subject to ninety minutes of heat at 135 degrees C. at a pressure of 1207 KPa. with localized vacuum at 737 mm. Hg. so as to permanently bond the thin, glass veneer sheets in their assembled shape on the thick, bent glass substrate. Following rapid cooling, the perimeter edges of the oversize glass veneer sheets are scribed using a carbide cutting wheel then snapped along the score lines with a dimensional accuracy of +/−0.8 mm to reduce the veneer to a size equal to or smaller than the thicker heat-treated bent glass substrate. Dimensional changes to the chemically-strengthened glass veneer sheets since occurring after ion-exchange result in an approximate 50% loss of compressive strength within 20 mm. of the alteration, but are undertaken without damage to the thicker heat-treated bent glass substrate. Excess polymer interlayer is then trimmed along the perimeter edges in planes parallel to the edge of thick bent glass substrate for an edge finish of high quality without misalignment.

The resulting bent glass panel is suitable to qualify by testing under CPSC CFR 1201 and ANSI Z97.1 as a safety glazing material for architectural and interior uses. The safety properties of the glass panel are enhanced by the convex and concave glass veneer sheets and polymer interlayers which safely encapsulate the residual internal stress within the thick heat-strengthened bent glass substrate suitable to prevent disintegration and particles dislodging in the event of its breakage, a desirable property to minimize any safety risk to building occupants and pedestrians beneath, especially during conditions of severe weather events. Additionally, the glass veneer sheet and polymer interlayer applied to the coated surface of the bent glass substrate has the added advantage of protecting the low-emissivity reflective coating from environmental degradation.

From the foregoing, it will be seen that this invention is one well adapted to obtain all the ends and objects herein set forth, together with other advantages which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:
1. A bent, laminated, high strength, glass safety glazing panel, said panel comprising:
 a single, fully-tempered bent glass substrate having opposed, major exterior convex and concave surfaces; the bent glass substrate having a thickness of between 7.0 mm. and 19.9 mm.; and said bent glass substrate having a surface compressive stress of at least 69 MPa.;
 a chemically-strengthened glass veneer sheet characterized by a surface compressive stress of at least 100 MPa., said glass veneer sheet having a thickness of between 0.28 mm. and 3.0 mm., and wherein said glass veneer sheet is made from alkali-containing glass material selected from the group consisting of alkali-aluminosilicate glass, soda-lime silicate glass, alkali-borosilicate glass, alkali-aluminoborosilicate glass, alkali-boron glass, alkali-germinate glass, and alkali-borogermanate glass;
 a polymer interlayer disposed between the bent glass substrate and the glass veneer sheet, wherein said polymer interlayer is made from material selected from the group consisting of polyvinyl butyral (PVB), ionoplast, ethyl vinyl acetate (EVA), thermoplastic polyurethane (TPU), polycarbonate, urethane, and cast-in-place (CIP) curable resins;
 said glass veneer sheet laminated by the polymer interlayer to at least one of said major exterior convex or concave surfaces of the bent glass substrate;
 wherein the glass veneer sheet is cold-bent to conform to the shape of the bent glass substrate;
 wherein the bent glass substrate comprises a first perimeter edge extending between opposing major surfaces of the glass substrate, wherein said first perimeter edge comprises a first sloped plane that extends to and terminates at said at least one of the major exterior convex or concave surfaces;
 the glass veneer sheet having a second perimeter edge extending between opposing major surfaces of the glass veneer sheet;
 wherein the polymer interlayer has a polymer interlayer edge having a second sloped plane aligned with and coplanar with the first sloped plane on the glass substrate, thereby forming a panel edge that is smooth and uniform; and,
 wherein the polymer interlayer provides a permanent bond between the cold-bent glass veneer sheet and the thicker bent glass substrate.

2. A bent, laminated, high strength, glass safety glazing panel, said panel comprising:
 a single, fully-tempered bent glass substrate having opposed, major exterior convex and concave surfaces; the bent glass substrate having a thickness of between 7.0 mm. and 19.9 mm.; and said bent glass substrate having a surface compressive stress of at least 69 MPa.;
 a chemically-strengthened glass veneer sheet characterized by a surface compressive stress of at least 100 MPa., said glass veneer sheet having a thickness of between 0.28 mm. and 3.0 mm., wherein said glass veneer sheet is made from alkali-containing glass material selected from the group consisting of alkali-aluminosilicate glass, soda-lime silicate glass, alkali-borosilicate glass, alkali-aluminoborosilicate glass, alkali-boron glass, alkali-germinate glass, and alkali-borogermanate glass;
 a polymer interlayer disposed between the bent glass substrate and the glass veneer sheet, wherein said polymer interlayer is made from material selected from the group consisting of polyvinyl butyral (PVB), ionoplast, ethyl vinyl acetate (EVA), thermoplastic polyurethane (TPU), polycarbonate, urethane, and cast-in-place (CIP) curable resins;

said glass veneer sheet laminated by the polymer interlayer to at least one of said major exterior convex or concave surfaces of the bent glass substrate;

wherein the glass veneer sheet has edges cut by an ultra short pulse laser selected from the group consisting of Picosecond and Femtosecond lasers, and wherein the glass veneer sheet is cold-bent to conform to the shape of the bent glass substrate;

wherein the bent glass substrate comprises a first perimeter edge extending between opposing major surfaces of the glass substrate, wherein said first perimeter edge comprises a first sloped plane that extends to and terminates at said at least one of the major exterior convex or concave surfaces;

the glass veneer sheet having a second perimeter edge extending between opposing major surfaces of the glass veneer sheet;

wherein the polymer interlayer has a polymer interlayer edge having a second sloped plane aligned with the first sloped plane on the glass substrate, thereby forming a panel edge that is smooth and uniform; and, wherein the polymer interlayer provides a permanent bond between the cold-bent glass veneer sheet and the thicker bent glass substrate.

* * * * *